United States Patent
Kando et al.

(10) Patent No.: US 7,762,893 B2
(45) Date of Patent: Jul. 27, 2010

(54) STORAGE MEDIUM HAVING GAME PROGRAM STORED THEREON AND GAME APPARATUS

(75) Inventors: Yuuji Kando, Kyoto (JP); Yutaka Hiramuki, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 692 days.

(21) Appl. No.: 11/327,353

(22) Filed: Jan. 9, 2006

(65) Prior Publication Data

US 2006/0252531 A1 Nov. 9, 2006

(30) Foreign Application Priority Data

Apr. 26, 2005 (JP) ............................. 2005-128133

(51) Int. Cl.
*A63F 13/00* (2006.01)
*A63F 9/24* (2006.01)
*A63F 13/06* (2006.01)

(52) U.S. Cl. .................. 463/37; 463/30; 463/31; 463/36; 463/43; 273/108.1; 273/461; 348/135; 348/141; 345/469; 345/655; 345/683; 345/950; 375/240.16

(58) Field of Classification Search .................. 463/1–5, 463/7–9, 30–34, 36–39, 40–43, 49–57; 273/148 R, 273/148 B, 309, 317.1, 340, 348, 361–367, 273/108.1, 127 R, 461; 348/115, 117, 211.14, 348/14.15, 39, 42, 47–52, 121, 135–137, 348/141, 576, 588–589, 719, 721, E13.004, 348/E13.064–E13.067; 717/168–178; 345/1.1–3.4, 345/24, 419, 467–469, 473, 539, 543–544, 345/625, 636, 638, 653–656, 664–666, 682–683, 345/686, 949–950, FOR. 139, FOR. 153; 434/37–38, 240, 43–44, 69, 118, 256–257; 375/240.15–240.16, 240.25; *A63F 13/00, A63F 13/06, 13/10, 9/24*

See application file for complete search history.

(56) References Cited

U.S. PATENT DOCUMENTS

| | | | | | |
|---|---|---|---|---|---|
| 4,353,552 | A | * | 10/1982 | Pepper, Jr. | 463/37 |
| 5,601,487 | A | * | 2/1997 | Oshima et al. | 463/4 |
| 5,769,713 | A | * | 6/1998 | Katayama | 463/3 |
| 5,863,248 | A | * | 1/1999 | Mine et al. | 463/4 |
| 6,120,374 | A | * | 9/2000 | Akada et al. | 463/3 |

(Continued)

FOREIGN PATENT DOCUMENTS

| | | |
|---|---|---|
| JP | 10-290886 | 11/1998 |
| JP | 10-333834 | 12/1998 |
| JP | 2000-61142 | 2/2000 |
| JP | 2003-24639 | 1/2003 |

OTHER PUBLICATIONS

*Pikmin Book*, the extra number of Famitsu, ENTERBRAIN, INC., pp. 36-37, Nov. 2001.

Explanation of Circumstances Concerning Accelerated Examination, Application No. 2005-128133, Aug. 8, 2008.

*Primary Examiner*—Peter DungBa Vo
*Assistant Examiner*—Arthur O. Hall
(74) *Attorney, Agent, or Firm*—Nixon & Vanderhye P.C.

(57) ABSTRACT

When a player is controlling a first object with a pointing device, an in-operation flag indicating that the player is controlling the first object with the pointing device is set as "ON". When the in-operation flag is set as "ON" and a second object is within a predetermined distance from an input position of the pointing device, the second object is selected. When the in-operation flag is set as "OFF", that is, when the player stops controlling the first object, the first object is caused to perform a process for exerting an effect on the second object having been selected.

15 Claims, 32 Drawing Sheets

U.S. PATENT DOCUMENTS

| | | | |
|---|---|---|---|
| 6,154,197 A * | 11/2000 | Watari et al. | 345/161 |
| 6,165,073 A * | 12/2000 | Miyamoto et al. | 463/32 |
| 6,191,777 B1 * | 2/2001 | Yasuhara et al. | 345/173 |
| 6,196,917 B1 * | 3/2001 | Mathias et al. | 463/2 |
| 6,217,446 B1 * | 4/2001 | Sanbongi et al. | 463/7 |
| 6,270,413 B1 * | 8/2001 | Aikawa et al. | 463/31 |
| 6,371,849 B1 * | 4/2002 | Togami | 463/4 |
| 6,494,783 B2 * | 12/2002 | Namba et al. | 463/3 |
| 6,524,186 B2 * | 2/2003 | Takatsuka et al. | 463/37 |
| 6,542,155 B1 * | 4/2003 | Mifune et al. | 345/428 |
| 6,602,139 B2 * | 8/2003 | Yamaguchi | 463/30 |
| 6,676,518 B1 * | 1/2004 | Sawa et al. | 463/31 |
| 6,762,746 B2 * | 7/2004 | Fukuda | 345/156 |
| 6,821,206 B1 * | 11/2004 | Ishida et al. | 463/43 |
| 7,366,995 B2 * | 4/2008 | Montague | 715/798 |
| 7,371,163 B1 * | 5/2008 | Best | 463/1 |
| 2001/0008846 A1 * | 7/2001 | Yamauchi et al. | 463/31 |
| 2002/0023265 A1 * | 2/2002 | Metcalf | 725/74 |
| 2002/0103031 A1 * | 8/2002 | Neveu et al. | 463/49 |
| 2003/0003978 A1 * | 1/2003 | Tsuchida | 463/7 |
| 2003/0017863 A1 | 1/2003 | Takahashi et al. | |
| 2003/0216177 A1 * | 11/2003 | Aonuma et al. | 463/32 |
| 2004/0207602 A1 * | 10/2004 | Okamura | 345/157 |

* cited by examiner

| OBJECT TYPE | TASK PROCESS |
|---|---|
| PLAYER CHARACTER | ADD PLAYER CHARACTER TO ARRAY |
| OPPONENT | HIT OPPONENT |
| FLOWER | PICK FLOWERS AND TAKE THE SAME TO BASE |
| FOOD | PICK UP FOOD AND CARRY THE SAME TO BASE |
| DEAD BODY OF OPPONENT | PICK UP DEAD BODY AND CARRY THE SAME TO BASE |

FIG. 22

| | FLAG NAME | ON | OFF | NUMBER |
|---|---|---|---|---|
| 254 | TOUCH INPUT FLAG | TOUCH PANEL IS KEPT TOUCHED | NEW INPUT | ONE |
| 255 | FOCUS FLAG | THE PLAYER CHARACTER IS DESIGNATED (= SURROUNDED BY RED CIRCLE (INSTRUCTION WAITING CIRCLE)) | THE PLAYER CHARACTER IS NOT DESIGNATED | EACH PLAYER CHARACTER HAS ITS FOCUS FLAG SET AS "ON" OR "OFF" |
| 256 | IN-OPERATION FLAG | PLAYER IS CONTROLLING FOCUS CHARACTER (YELLOW CIRCLE (OPERATION CIRCLE) IS INDICATED) | PLAYER IS NOT CONTROLLING FOCUS CHARACTER (= PLAYER IS NOT TOUCHING TOUCH PANEL) | ONE |
| 257 | LOCK FLAG | THE OBJECT IS LOCKED ON (GREEN CIRCLE (TARGET CIRCLE) IS INDICATED) | THE OBJECT IS NOT LOCKED ON | EACH OBJECT HAS ITS LOCK FLAG SET AS "ON" OR "OFF" |

| VECTOR | DIRECTION | MAGNITUDE |
|---|---|---|
| VECTOR A | 2 | 1 |
| VECTOR B | 2 | 1 |

STORAGE MEDIUM HAVING GAME PROGRAM STORED THEREON AND GAME APPARATUS

CROSS REFERENCE OF RELATED APPLICATION

The disclosure of Japanese Patent Application No. 2005-128133 is incorporated herein by reference.

BACKGROUND OF THE INVENTION

1. Field of the Invention

The present invention relates to a storage medium having a game program stored thereon and a game apparatus, and more particularly to a storage medium having stored thereon a game program and a game apparatus for which a pointing device is used as an input device.

2. Description of the Background Art

Conventionally, there is a game in which a player causes an object to perform a predetermined action such as attacking another object. The object is caused to perform the predetermined action in the following methods.

For example, in a game such as an ARPG (action roll playing game), when a player object is moved so as to be very close to an opponent object, a player presses an attack button, whereby, for example, a player character attacks the opponent character with a sword.

Further, there is a following method. A player performs an operation for moving a player object having a plurality of first objects while operating a controller stick so as to aim a cursor at a target. While aiming the cursor at the target, the player presses a button, whereby the player object throws one of the plurality of first objects at the target. The remaining first objects automatically start to perform a predetermined action, such as attacking the target, according to what the target is. (For example, see "Pikmin Book", the extra number of Famitsu, ENTERBRAIN, INC. pages 36 to 37, November, 2001)

Further, disclosed in, for example, Japanese Laid-Open Patent Publication No. 10-290886 is a sight line control method. The sight line control method disclosed therein is not used for performing the aforementioned attack and the like. The sight line control method is, for example, used for a soccer game in which when a distance between a player character and a ball satisfies a predetermined condition, the player character turns its eyes on the ball.

However, the aforementioned game system has the following problems.

Firstly, when a player desires to cause a player object to attack an opponent object, the player moves the player object so as to approach the opponent object and presses an attack button. This series of operations may not be necessarily appropriate depending on a game content.

Further, when a method is used in which a player character throws objects which the player character has so as to automatically start a predetermined action, an operation for turning a cursor to a target is required before the predetermined action automatically starts. Therefore, depending on a game content, the player will be bothered with the operation for turning the cursor to the target, thereby deteriorating controllability for the player.

Alternatively, in the sight line control method, when the distance between the player character and an object satisfies a predetermined condition, the player character may start to perform the aforementioned predetermined action without turning its eyes on the object. In this case, however, as soon as the distance satisfies the predetermined condition, an attack operation or the like is started. Therefore, the operation may be performed against the player's intention, thereby resulting in controllability for the player being deteriorated.

SUMMARY OF THE INVENTION

A storage medium is disclosed herein having thereon a game program and a game apparatus which can enhance controllability by allowing a player to intuitively perform an operation and preventing an operation from being performed against the player's intention.

A first aspect of the is directed to a storage medium having stored thereon a game program to be executed by a computer in a game apparatus comprising a display screen such as a second LCD 12 in embodiments and a pointing device (15). The game program comprises: a coordinate detection step (for example, step S2 in the embodiments: hereinafter, only step number will be indicated); an operation state determination step (S12 and S13); a movement control step (S14); a positional relationship determination step (S7); and an effect operation process step (S74). The display screen is used for displaying a game image. The pointing device is an input device associated with the display screen. The coordinate detection step detects, at regular time intervals, a coordinate value which is inputted through the pointing device and indicates a position on the display screen, based on an output signal from the pointing device. The operation state determination step determines whether or not a player is controlling a first object with the pointing device, based on the output signal from the pointing device. Here, an operation of a player being controlling a first object is, for example, the following operation. The first object is clicked by a mouse and the mouse is moved with a mouse button being kept Pressed (drag operation), or the stick which is pressing the first object being displayed on the touch panel is moved touching the touch panel (without the stick being removed from the touch panel) so as to control the first object. The movement control step moves, when the operation state determination step determines that the player is controlling the first object, the first object based on the coordinate value detected in the coordinate detection step. The positional relationship determination step determine, when the operation state determination step determines that the player has stopped controlling the first object, a positional relationship on the display screen between a second object and a final input position, based on positional information of the second object and positional information of the final input position, the final input position corresponding to a position associated with a final input operation performed through the pointing device by the player. The effect operation process step causes either one of the first object and the second object to perform an operation for exerting an effect on the other when the positional relationship determination step determines that a predetermined positional relationship is satisfied.

In a second aspect which is based on the first aspect, the positional relationship determination step determines, when the operation state determination step determines that the player has stopped controlling the first object, a positional relationship between a final position of the second object and a position on the display screen, and the position on the display screen is represented by the coordinate value finally detected in the coordinate detection step.

In a third aspect, which is based on the first aspect, the positional relationship determination step determines, when the operation state determination step determines that the player has stopped controlling the first object, a positional relationship between a final position of the first object and a final position of the second object.

In a fourth aspect, which is based on the first aspect, the positional relationship determination step determines whether or not a distance between the second object and an input position has a value smaller than a predetermined value, based on positional information of the second object and positional information of the input position, the input position corresponding to a position associated with the input operation performed through the pointing device by the player. Further, when a plurality of the second objects are away from the input position by a distance having a value smaller than the predetermined value, the effect operation process step performs the operation for exerting an effect on a second object closest to the input position on the display screen among the plurality of the second objects.

In a fifth aspect, which is based on the first aspect, the effect operation process step causes the first object having been controlled by the player to perform the operation for exerting an effect.

In a sixth aspect, which is based on the first aspect, the predetermined positional relationship indicates that the distance between the second object and the input position on the display screen has a value smaller than a predetermined value.

In a seventh aspect, which is based on the first aspect, the operation for exerting an effect changes either one of a parameter value of the first object and a parameter value of the second object.

In an eighth aspect, which is based on the first aspect, the computer program causes the computer to further execute a marking step (S67) for indicating on the screen, when the positional relationship determination step determines that the predetermined positional relationship is satisfied, that the predetermined positional relationship is satisfied.

In a ninth aspect, which is based on the eighth aspect, the positional relationship determination step determines whether or not the distance between the second object and the input position has a value smaller than the predetermined value, based on the positional information of the second object and the positional information of the input position. Further, the marking step indicates, when a plurality of the second objects are away from the input position by a distance having a value smaller than the predetermined value, only a second object closest to the input position on the display screen among the plurality of the second objects.

In a tenth aspect, which is based on the ninth aspect, after the marking step indicates on the screen the second object closest to the input position, the marking step continues to indicate, even when the distance between the second object and the input position is changed, the second object on the screen until the operation for exerting an effect is started.

In an eleventh aspect, which is based on the eighth aspect, the computer program causes the computer to further execute a type determination step for determining, when the positional relationship determination step determines that the predetermined positional relationship is satisfied, a type of the second object which satisfies the predetermined positional relationship. The marking step indicates on the screen that the predetermined positional relationship is satisfied by using at least one of a predetermined shape and a predetermined color according to the object type determined in the type determination step.

In a twelfth aspect, which is based on the first aspect, the pointing device is a touch panel provided on the display screen. Further, in a case where a first input coordinate value is obtained when the touch panel is touched initially after a player has stopped touching the touch panel, and the first input coordinate value is followed by a series of second input coordinate values being sequentially inputted, the movement control step moves the first object to a destination having the final second input coordinates in accordance with a predetermined algorithm. Moreover, the effect operation process step causes the first object to perform a different operation depending on a type of the second object which is at a position corresponding to the second input coordinates which are detected finally before the player stops touching the touch panel.

A thirteenth aspect is directed to a storage medium having stored thereon a game program to be executed by a computer in a game apparatus comprising a display screen (12) and a pointing device (15). The game program comprises: a coordinate detection step (S2); an operation state determination step (S12 and S13); a vector data calculation step (S93 and S94); a destination object determination step (S101); and an effect operation process step (S74). The display screen is used for displaying a game image. The pointing device is an input device associated with the display screen. The coordinate detection step detects, at regular time intervals, a coordinate value which is inputted through the pointing device and indicates a position on the display screen based on an output signal from the pointing device. The operation state determination step determines whether or not a player is controlling a first object with the pointing device based on the output signal from the pointing device. The vector data calculation step calculates, based on coordinate values detected in the coordinate detection step, vector data indicating a direction of a destination to move the first object being controlled by the player toward. The destination object determination step determines, when the operation state determination step determines that the player has stopped controlling the first object, whether or not the second object is in the direction of the destination to move the first object toward, the direction indicated by the vector data. The effect operation process step causes either one of the first object being controlled by the player and the second object to perform an operation for exerting an effect on the other when the destination object determination step determines that the second object is in the direction of the destination to move the first object toward.

In a fourteenth aspect, which is based on the twelfth aspect, only when the operation state determination step determines that the player has stopped controlling the first object and a speed at which the player makes an input of the vector data has a value greater than a predetermined value, the destination object determination step determines whether or not the second object is in the direction of a vector represented by the vector data.

The aforementioned invention may be realized as a game apparatus comprising a computer executed by the game program.

According to the first aspect, while a first object (player character) is being controlled using a pointing device and the like, an object to be attacked, etc., can be designated without performing another operation for designating an opponent character and the like. At a time of a spontaneous operation being performed for stopping controlling the first object, such as removing a finger from the pointing device or removing a finger from a touch panel, one of the first object being controlled by a player or a second object which is the designated object can be caused to start an operation for exerting an effect on the other. Further, since the player can consciously stop controlling the first object, the player can determine a time of starting the process for exerting an effect according to the player's intention. Therefore, it is unnecessary to perform another operation for causing the first object to start the operation for exerting an effect, for example, by using an attack button or a command set button, thereby improving controllability for the player. As a result, a game providing the player with intuitive controllability can be provided.

According to the second aspect and the third aspect, the same effect as that of the first aspect can be obtained.

According to the fourth aspect, when the player stops controlling the first object (player character) through the pointing device and the like, a plurality of second objects may be near a position on a screen, the position indicated by the positional information associated with an input operation performed through the pointing device by the player, such as a final input position or a final position of the first object. Even in this case, only the second object closest to the position on the screen, the position indicated by the positional information associated with the input operation performed through the pointing device by the player, can be set as a target on which an effect is to be exerted. If the effect is exerted on a second object other than a second object closest to the position indicated by the positional information associated with the input operation performed through the pointing device by the player, the player feels this operation unnatural and he or she may be dissatisfied with this operation. However, such an unnatural operation can be avoided in the game system disclosed herein.

According to the fifth aspect, the first object being controlled by the player is caused to perform an operation for exerting an effect on the second object. Therefore, the player can actively enter a game world so as to exert an effect on an object in the game, whereby the player feels the game further amusing.

According to the sixth aspect, if a distance between the second object and the position on the screen indicated by positional information associated with the input operation performed through the pointing device by the player does not have a value smaller than a predetermined value, the operation for exerting an effect is not started. Therefore, when an operation for exerting an effect on the second object is not required, such an operation can be avoided. That is, the player can determine an object on which an effect is to be exerted. Further, the player can perform an input operation through the pointing device such that the distance between the second object and the position indicated by the positional information associated with the input operation performed through the pointing device has a value smaller than the predetermined value, whereby the player can intuitively perform an operation so as to determine an object on which the effect is to be exerted.

According to the seventh aspect, the operation for exerting an effect includes an operation for changing a parameter value of the object. Accordingly, the object on which the effect is to be exerted can be caused to perform various actions by changing the parameter value. As a result, different game development can be obtained from the same input operation, thereby enabling wide range of game variations to be provided.

According to the eighth aspect, the player can visually recognize a second object on which an effect is to be exerted. As a result, the player can easily confirm whether or not a desired object has been designated.

According to the ninth aspect and tenth aspect, when a plurality of second objects are near a position associated with an input operation performed through the pointing device by the player, a target on which an effect is to be exerted can be prevented from being frequently changed among the plurality of second objects and displayed.

According to the eleventh aspect, since indication of an object on which an effect is to be exerted is changed depending on a type of the object, the player can intuitively and easily recognize the object on which the effect is to be exerted.

According to the twelfth aspect, the pointing device is a touch panel provided on the display screen, thereby enabling the player to increasingly intuitively control the game. Further, the first object is caused to perform a predetermined action depending on the second object which is closest to a position at which the player removes a finger from the touch panel. Therefore, the player is allowed to increasingly intuitively control the game.

According to the thirteenth aspect, even if a distance between the second object and a position associated with an input operation performed through the pointing device by a player has a large value, one of the first object or a predetermined second object can be caused to start the operation for exerting an effect on the other at a time of a spontaneous operation being performed for stopping controlling the first object. Therefore, controllability for the player can be improved.

According to the fourteenth aspect, only when an input speed at which the first object is controlled has a value greater than a predetermined value, the process according to the seventh aspect is performed. Thereby, the operation for exerting an effect can be prevented from being started against the player's intention.

According to the fifteenth aspect, the same effect as that of the aforementioned game program can be obtained.

These and other objects, features, aspects and advantages of the present invention will become more apparent from the following detailed description of the present invention when taken in conjunction with the accompanying drawings.

BRIEF DESCRIPTION OF THE DRAWINGS

FIG. 10 is a diagram illustrating a state of food 42 being locked on;

FIG. 12 is a diagram illustrating a state of an opponent character 43 being locked on;

FIG. 14 is a diagram illustrating a state of the opponent character 43 being locked on;

FIG. 21 is a diagram illustrating an example of a task content determination table 253;

FIG. 22 is a table providing a listing of the respective flags according to the embodiments;

DESCRIPTION OF THE PREFERRED EMBODIMENTS

First Embodiment

Hereinafter, a configuration and an operation of a game apparatus according to a first embodiment of the present invention will be described.

Figure 1:
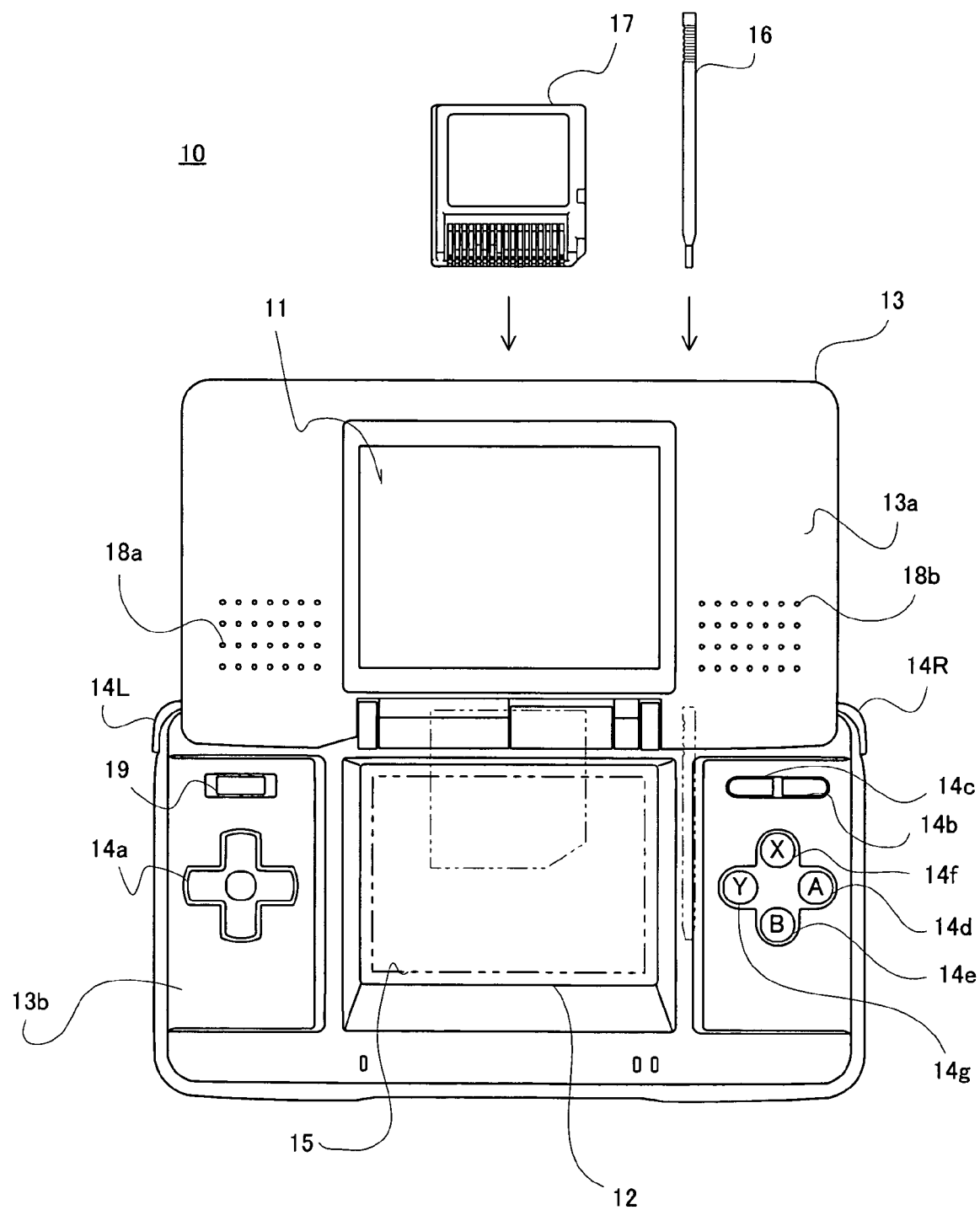
FIG. 1 is a view illustrating an outer appearance of a game apparatus according to an embodiment of the present invention.

FIG. 1 is a view illustrating an outer appearance of a game apparatus according to an embodiment of the present invention. In FIG. 1, a game apparatus 10 includes a first liquid crystal display (hereinafter, referred to as "an LCD") 11 and a second LCD 12. A housing 13 is composed of an upper housing 13a and a lower housing 13b. The first LCD 11 is accommodated in the upper housing 13a and the second LCD 12 is accommodated in the lower housing 13b. Each of the first LCD 11 and the second LCD 12 has are solution of 256 dots×192 dots. Although in the present embodiment, an LCD is used as a display device, any other display device, for example, a display device using an EL (electro luminescence), can be used. The resolution of display may be arbitrarily chosen.

Figure 2:
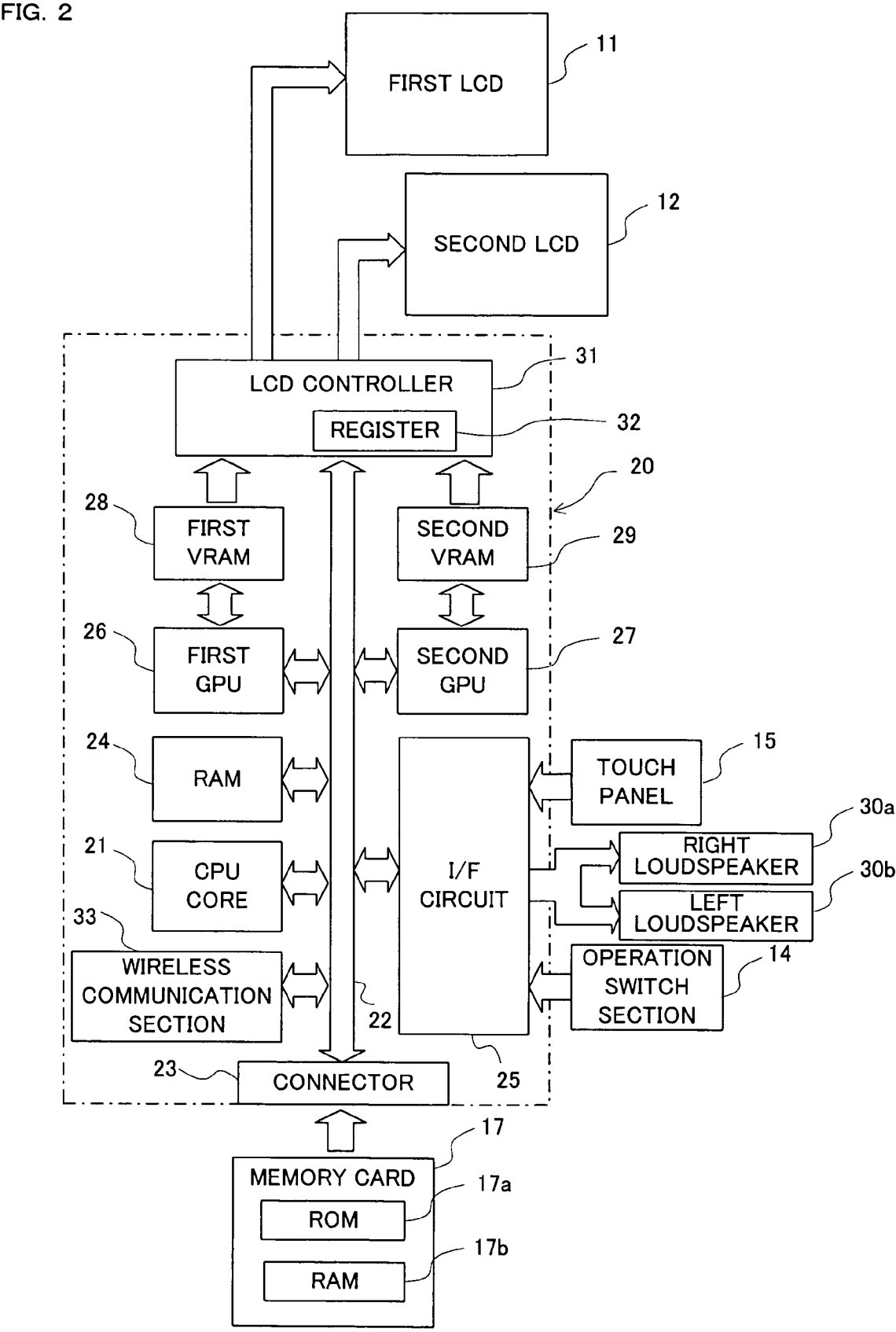
FIG. 2 is a diagram illustrating an internal structure of the game apparatus shown in FIG. 1.

On the upper housing 13a, provided are sound holes 18a and 18b for outputting a sound from a pair of loudspeakers 30a and 30b shown in FIG. 2 described below.

On the lower housing 13b, provided as input devices are a cross switch 14a, a start switch 14b, a select switch 14c, an A button 14d, a B button 14e, an X button 14f, a Y button 14g, an L button 14L and an R button 14R. Further, the second LCD 12 has a touch panel 15 mounted on the screen thereof as another input device. Moreover, the lower housing 13b is provided with a power supply switch 19, and respective receptacles into which a memory card 17 and a stick 16 are inserted.

The touch panel 15 may be of any type such as a resistive film type, an optical type (infrared type), or a capacitive coupling type. The touch panel 15 has a function of outputting, when the touch panel 15 has its surface touched by the stick 16, coordinate data corresponding to the touched position. Although in the present embodiment a player controls the touch panel 15 with the stick 16, the player can control the touch panel 15 with a pen (stylus pen) or a finger instead of the stick 16. In the present embodiment, the touch panel 15 has a resolution (detection accuracy) of 256 dots×192 dots, similar to the resolution of the second LCD 12. However, the touch panel 15 need not necessarily have the same resolution as the second LCD 12.

The memory card 17 is a storage medium having a game program stored thereon, and is detachably inserted into a receptacle provided in the lower housing 13b.

Next, referring to FIG. 2, the internal structure of the game apparatus 10 will be described. In FIG. 2, a CPU core 21 is mounted on the electronic circuit board 20 accommodated in the housing 13. Via a bus 22, the CPU core 21 is connected to a connector 23, an input/output interface circuit (denoted as an I/F circuit in FIG. 2) 25, a first graphics processing unit (hereinafter, referred to as "GPU") 26, a second GPU 27, a RAM 24, an LCD controller 31, and a wireless communication section 33. The memory card 17 is detachably connected to the connector 23. The memory card 17 includes a ROM 17a for storing a game program and a RAM 17b for storing backup data in a rewritable manner. A game program stored in the ROM 17a of the memory card 17 is loaded to the RAM 24, and the game program having been loaded to the RAM 24 is executed by the CPU core 21. Temporary data obtained by the CPU core 21 executing the game program and data from which to generate game images are stored in the RAM 24 in addition to the game program. The touch panel 15, the right loudspeaker 30a, the left loudspeaker 30b and an operation switch section 14 including the cross switch 14a, the A button 14d and the like as shown in FIG. 1 are connected to the I/F circuit 25. The right loudspeaker 30a and the left loudspeaker 30b are placed inside the sound holes 18a and 18b, respectively.

The first GPU 26 is connected to a first video-RAM (hereinafter "VRAM") 28. The second GPU 27 is connected to a second VRAM 29. In accordance with an instruction from the CPU core 21, the first GPU 26 generates a first game image using the data stored in the RAM 24 for generating a game image, and writes image data into the first VRAM 28. Similarly, in accordance with an instruction from the CPU core 21, the second GPU 27 generates a second game image, and writes image data into the second VRAM 29. The first VRAM 28 and the second VRAM 29 are connected to the LCD controller 31.

The LCD controller 31 include a register 32. The register 32 stores a value "0" or "1" in accordance with an instruction from the CPU core 21. When the register 32 stores a value "0", the LCD controller 31 outputs to the first LCD 11 the first game image which has been written into the first VRAM 28, and outputs to the second LCD 12 the second game image which has been written into the second VRAM 29. On the other hand, when the register 32 stores a value "1", the LCD controller 31 outputs to the second LCD 12 the first game image which has been written into the first VRAM 28, and outputs to the first LCD 11 the second game image which has been written into the second VRAM 29.

The wireless communication section 33 has a function of exchanging data used for game process and other data with a wireless communication section 33 of another game apparatus, and the function is, for example, a wireless communication function based on the IEEE802.11 wireless LAN standard. The wireless communication section 33 outputs the received data to the CPU core 21. Further, the wireless communication section 33 transmits data to another game apparatus according to an instruction from the CPU core 21. The wireless communication section 33 or the storage section of the game apparatus 10 has a protocol such as TCP/IP (transmission control protocol/Internet protocol) or a predetermined browser, whereby the game apparatus 10 can be connected to a network such as the Internet via the wireless communication section 33. The game apparatus 10 enables data such as a document and an image accessible on a network to be displayed on the first LCD 11 and the second LCD 12.

The aforementioned configuration of the game apparatus 10 is an example. The present invention is applicable to any computer system having a pointing device such as a touch panel, a mouse or a touch pad and at least one display device. Further, the game program of the present invention may be supplied to the computer system not only through an external storage medium such as the memory card 17 but also through a wired or a wireless communication line. Moreover, the game program of the present invention may be previously stored in a non-volatile storage device in the computer system.

Figure 3:
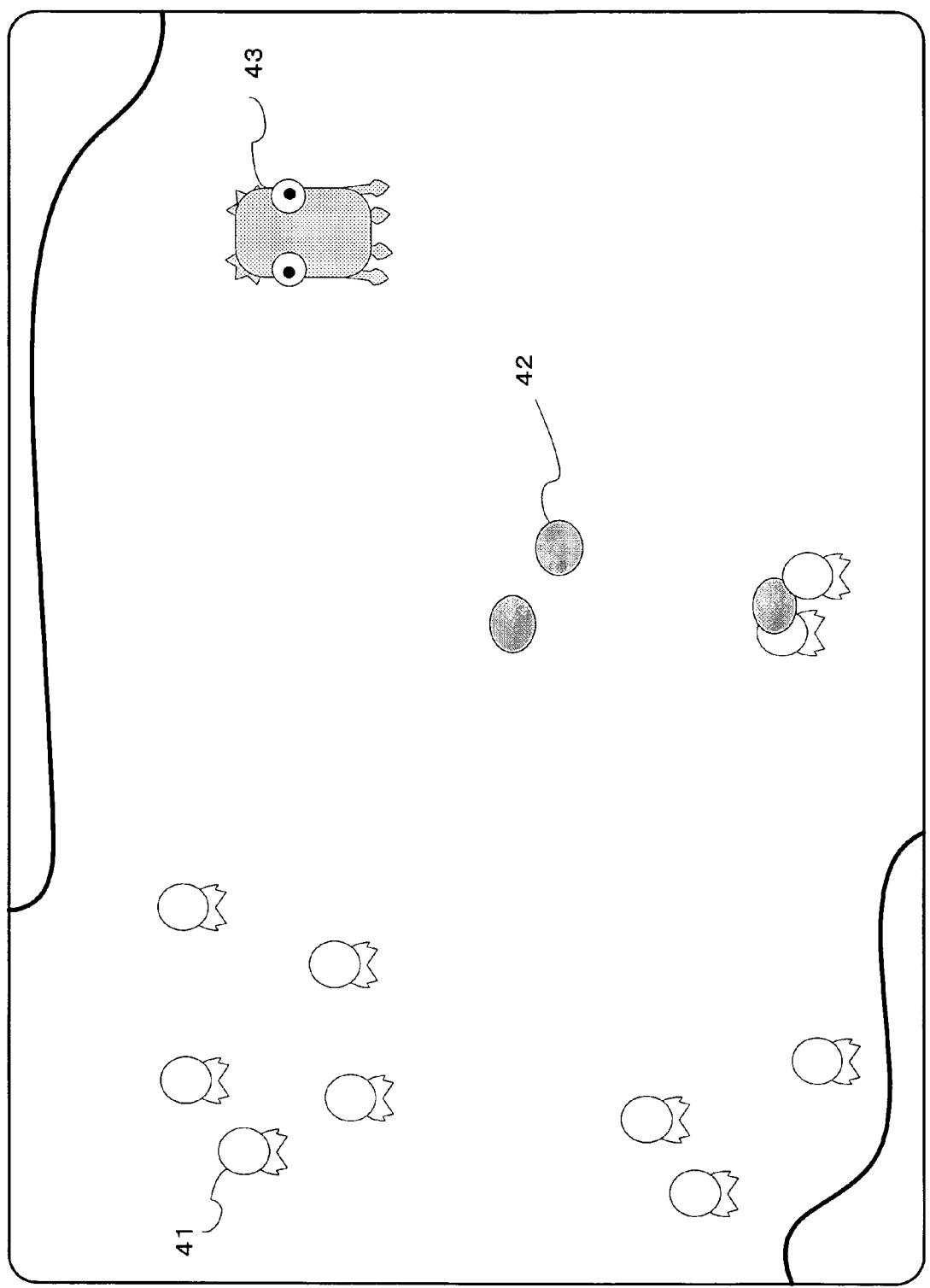
FIG. 3 shows an example of a game screen according to the embodiments of the present invention.
Figure 4:
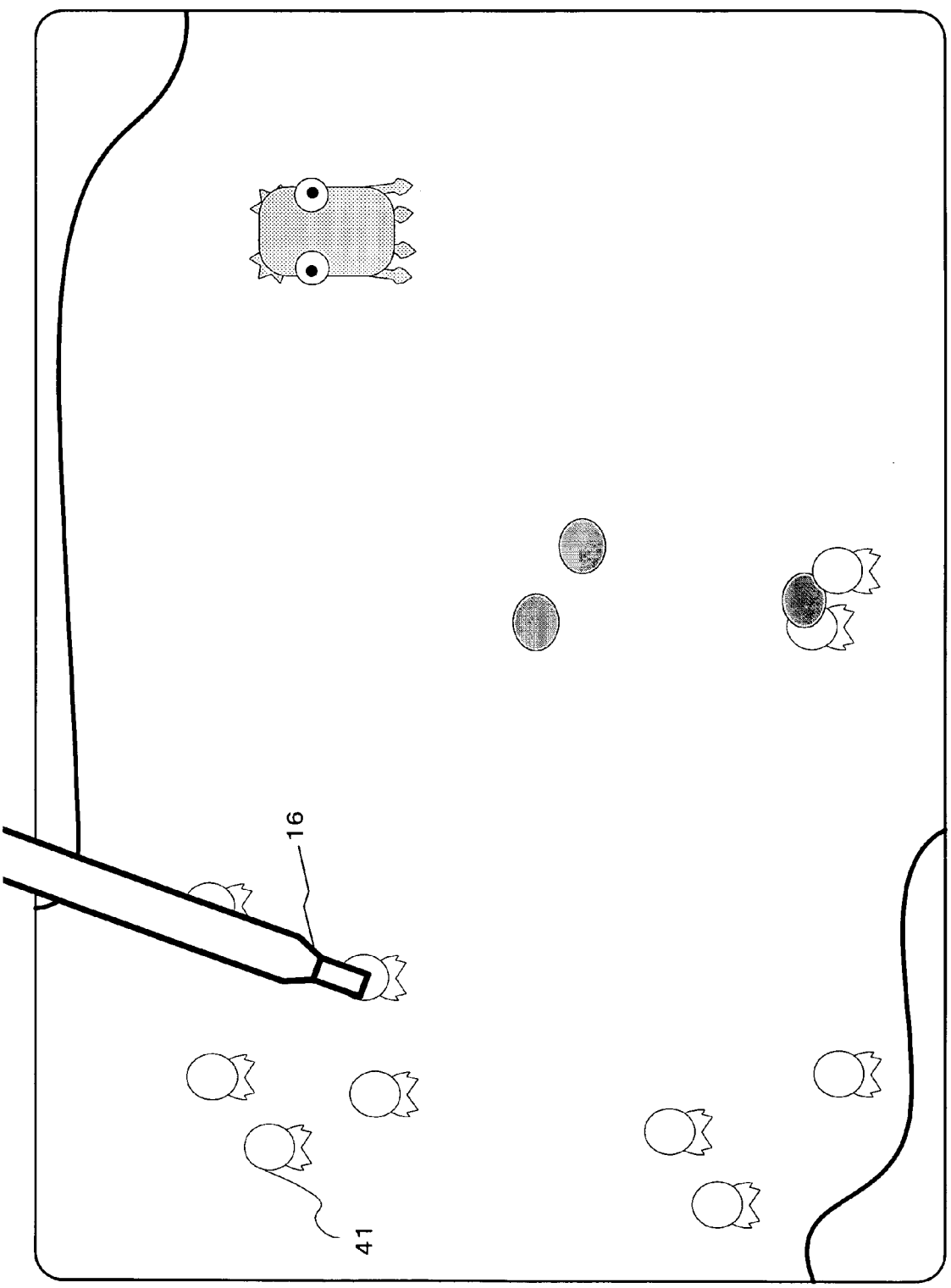
FIG. 4 is a diagram illustrating a state in the case of a single player character being designated.
Figure 5:
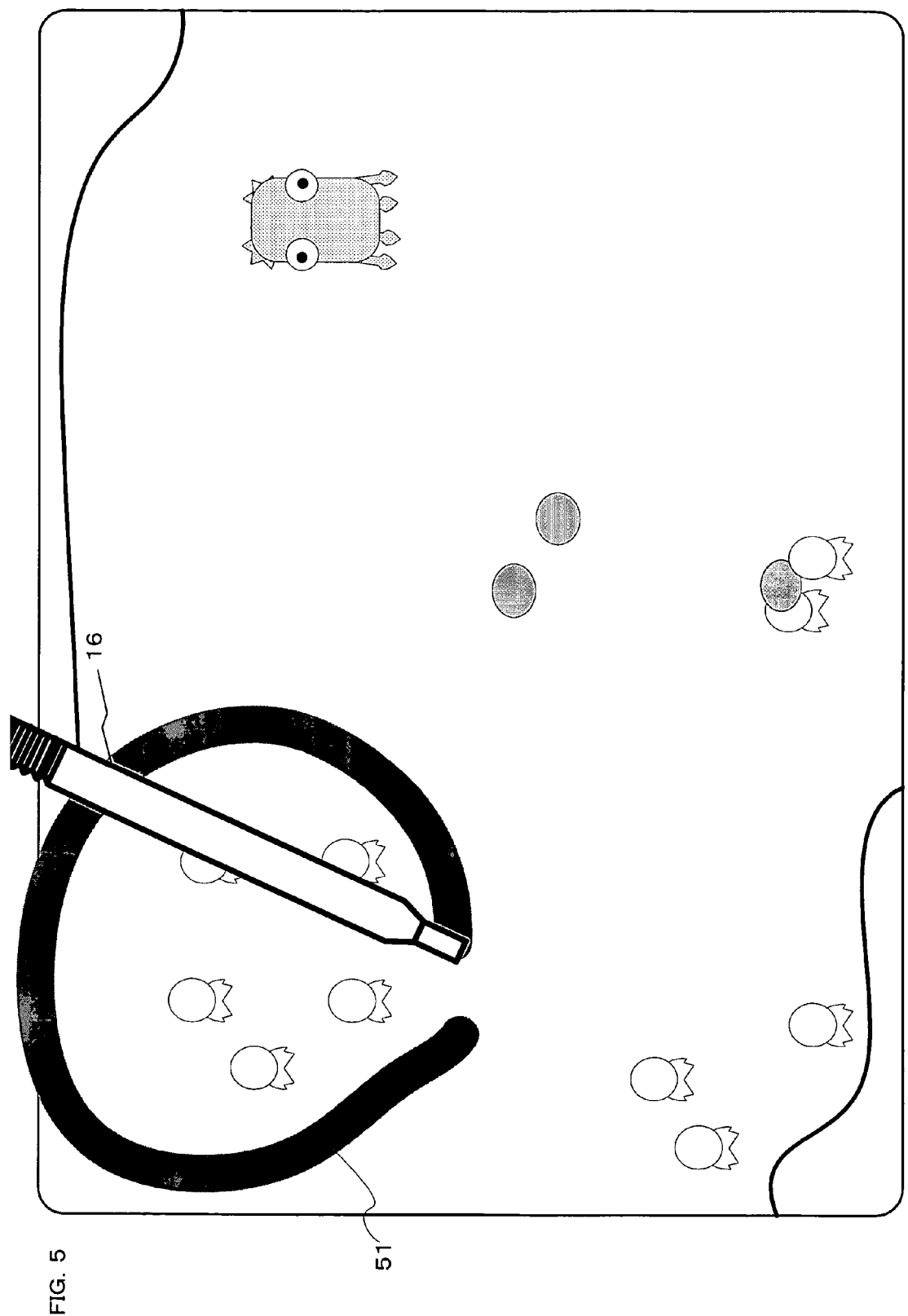
FIG. 5 is a diagram illustrating a state in the case of a plurality of player characters being designated.
Figure 6:
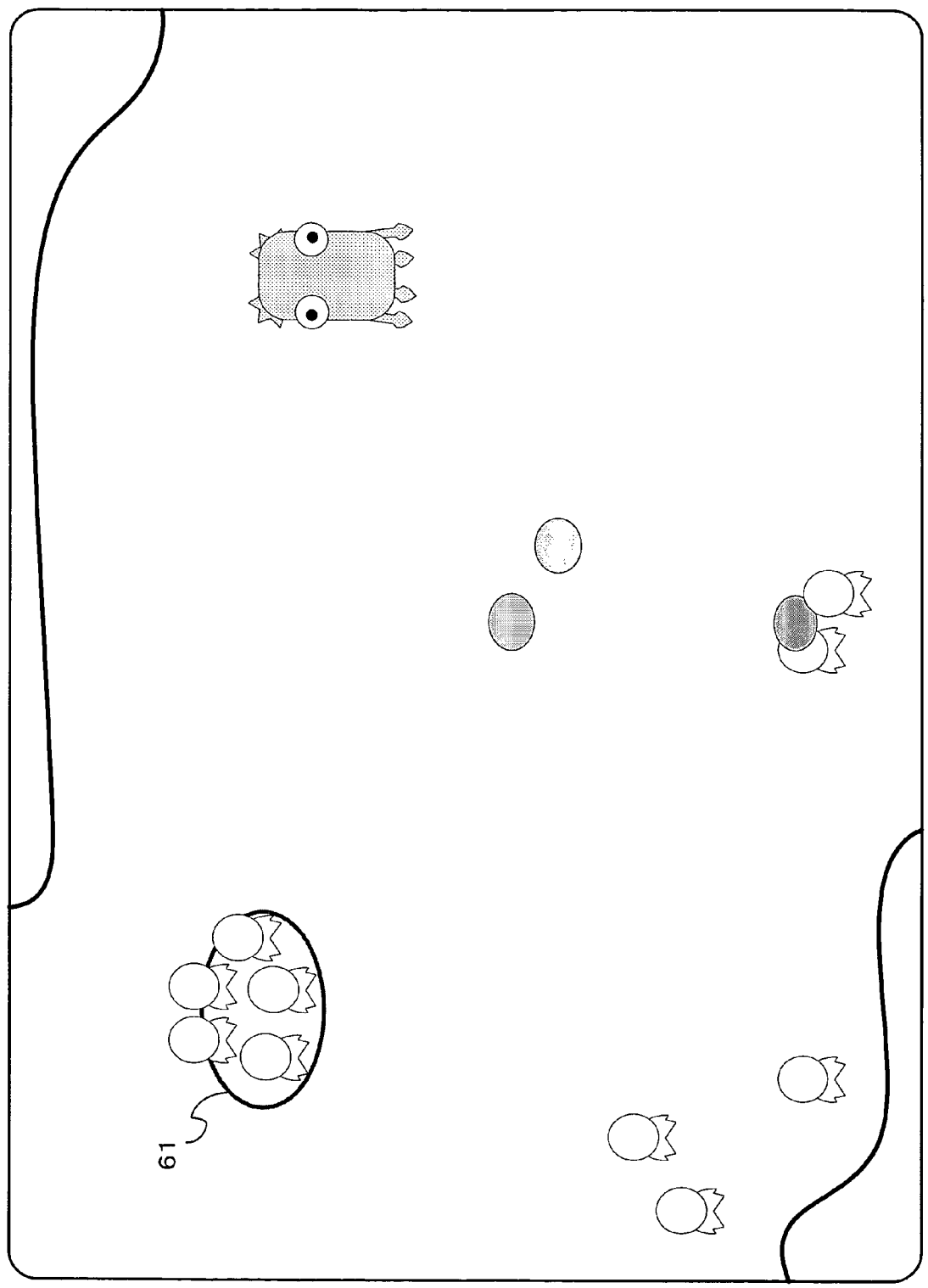
FIG. 6 is a diagram illustrating an array of a plurality of player characters.
Figure 7:
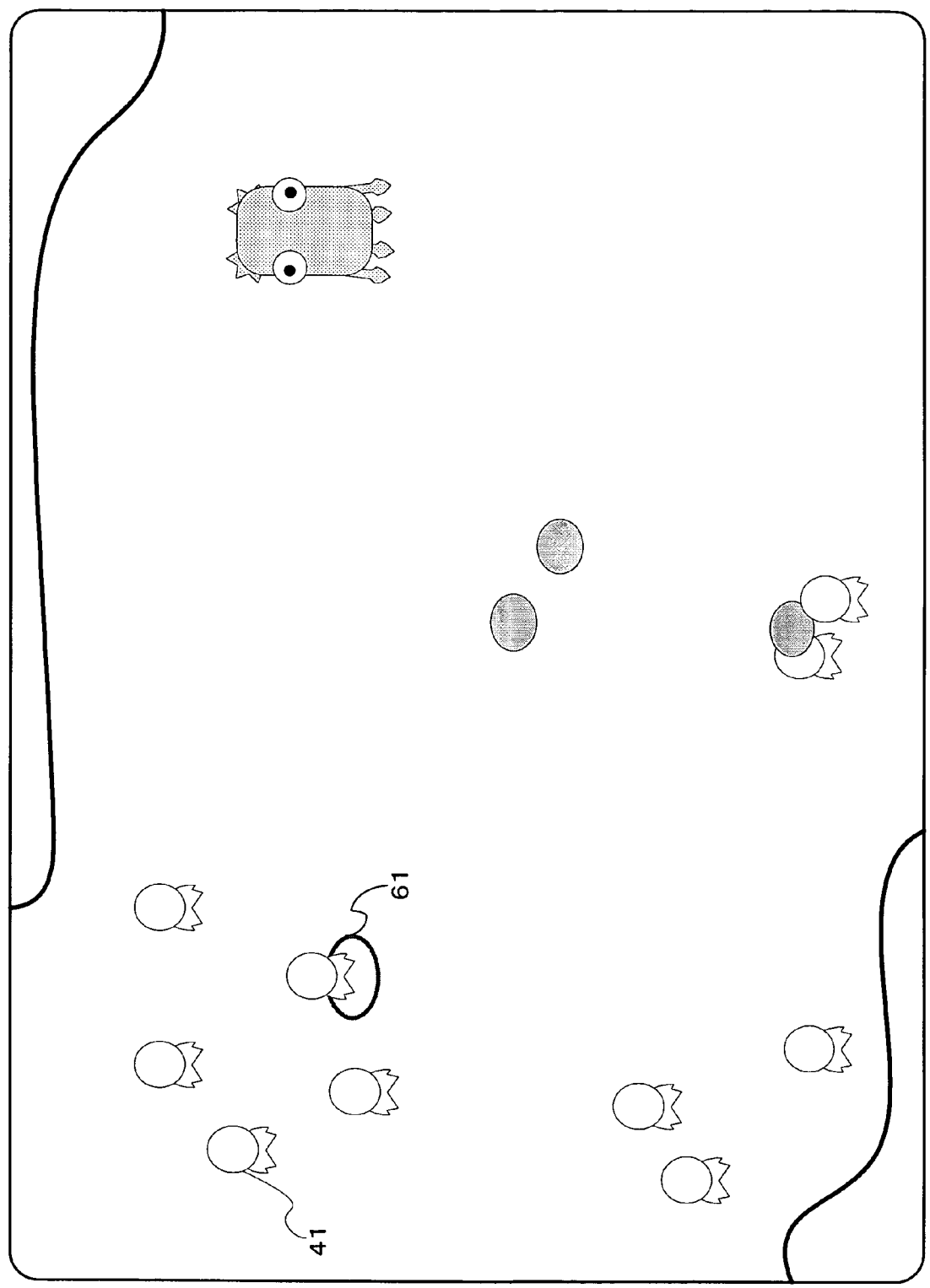
FIG. 7 is a diagram illustrating an array of a single player character.
Figure 8:
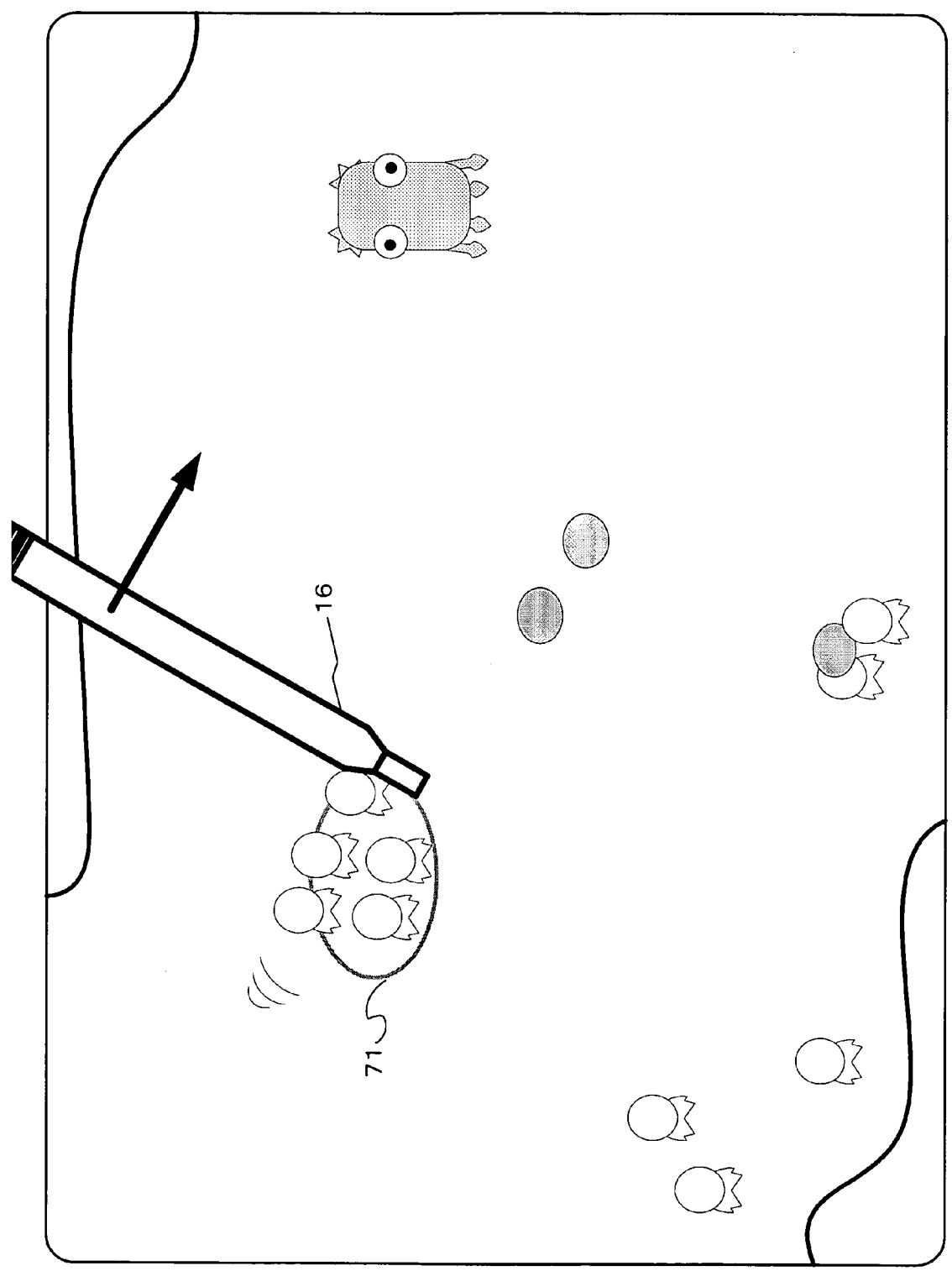
FIG. 8 is a diagram illustrating a state of the player characters being moved.
Figure 9:
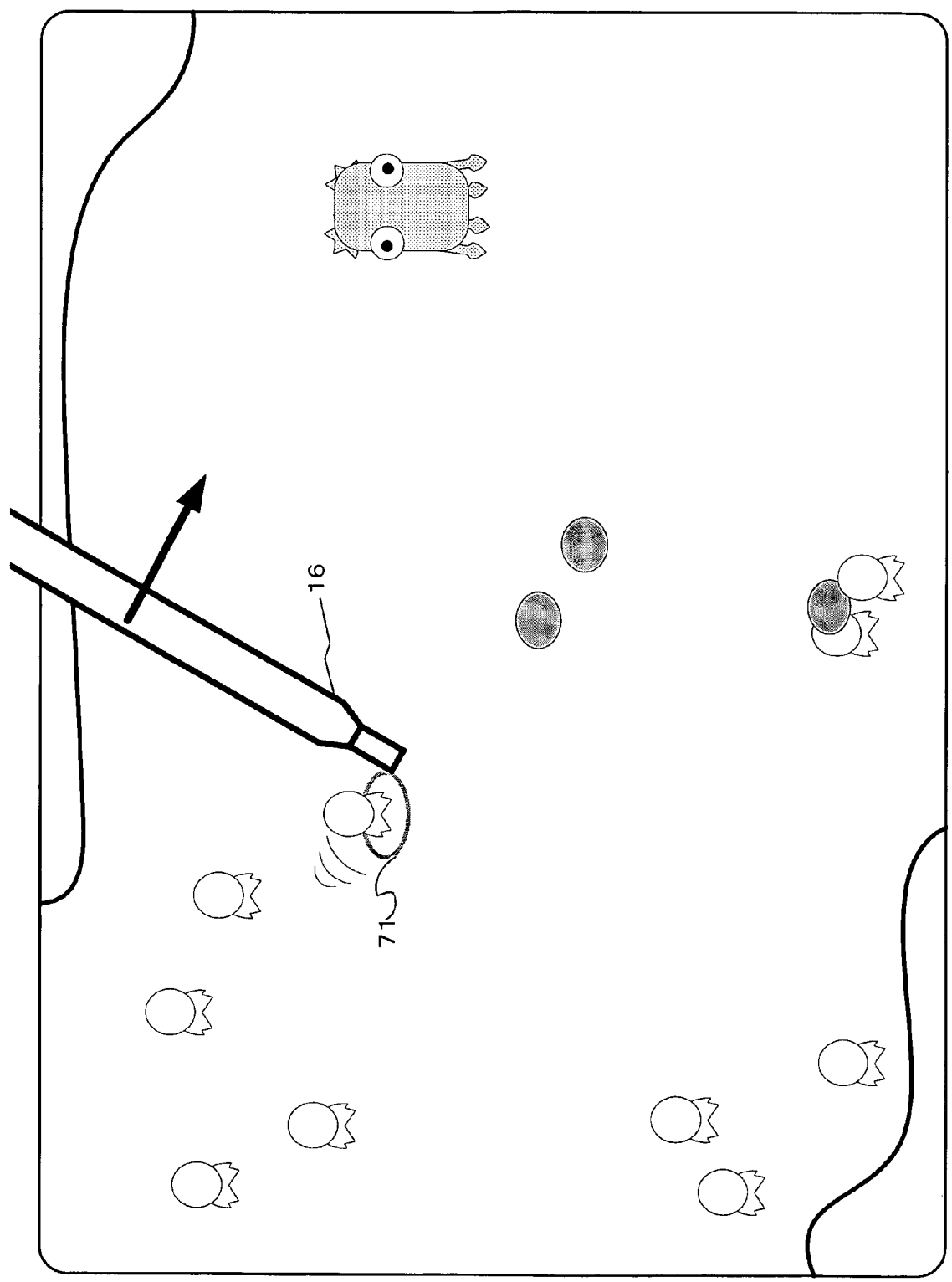
FIG. 9 is a diagram illustrating a state of the single player character being moved.

Next, with reference to FIGS. 3 to 18, an outline of the game according to the present embodiment will be described. FIG. 3 shows an example of a game screen according to the present embodiment. In the game, a player character 41 is designated, as a target to be controlled, from among a plurality of player characters 41 scattered on the screen. The designating operation has two methods. In one method, a single player character 41 is designated. In the other method, a plurality of player characters 41 are designated. When a single player character is designated, as shown in FIG. 4, a player character 41 to be designated is directly pointed at with the stick 16 or a finger. On the other hand, when a plurality of player characters are designated, a group of the player characters to be designated is surrounded using the stick 16. Specifically, as shown in FIG. 5, a player moves the stick 16 on the touch panel 15. At this time, the player performs an operation for surrounding arbitral player characters 41 by a track obtained by moving the stick 16. The track indicates positions at which the player makes inputs on the touch panel 15. Hereinafter, the track is referred to as an input track. When the group of the arbitral player characters is surrounded, the surrounded player characters are preferably gathered into an array. At this time, as shown in FIG. 6, the player character group is surrounded by a red circle 61 (hereinafter, referred to as an instruction waiting circle) for display. Hereinafter, each of the player characters 41 surrounded by the instruction waiting circle is referred to as a focus character. The single player character 41 surrounded by the instruction waiting circle is also referred to as a focus character. That is, when a single player character 41 is designated, an array of the single player character 41 is formed as shown in FIG. 7. When a player touches the array, the instruction waiting circle 61 changes to a yellow circle 71 (hereinafter, referred to as an operation circle), and the operation circle is indicated until the player removes the stick 16 from the touch panel 15. This operation circle indicates that the array is being moved and also indicates that the player is touching the touch panel 15. Hereinafter, a state of the operation circle 71 being displayed is referred to as an in-operation state. In the in-operation state, when the player moves the stick 16 touching the touch panel 15, the respective focus characters start to move at respective speeds toward a position touched by the stick 16 (more specifically, a point which is in a game world and corresponds to the position touched by the stick 16) as a destination to move toward. Thus, the player can drag and move the array as shown in FIGS. 8 and 9. The player can move the array to various positions on the screen and cause the focus character group of the array to perform various actions (hereinafter, referred to as "task"). The "task" includes, for example, attacking the opponent character 43, carrying fallen food 42 to a base (not shown), or adding to the array a player character 41 which does not belong to the array. In this game, the aforementioned operations are repeated to have the player characters 41 live, grow, etc., in the game world.

Figure 10:
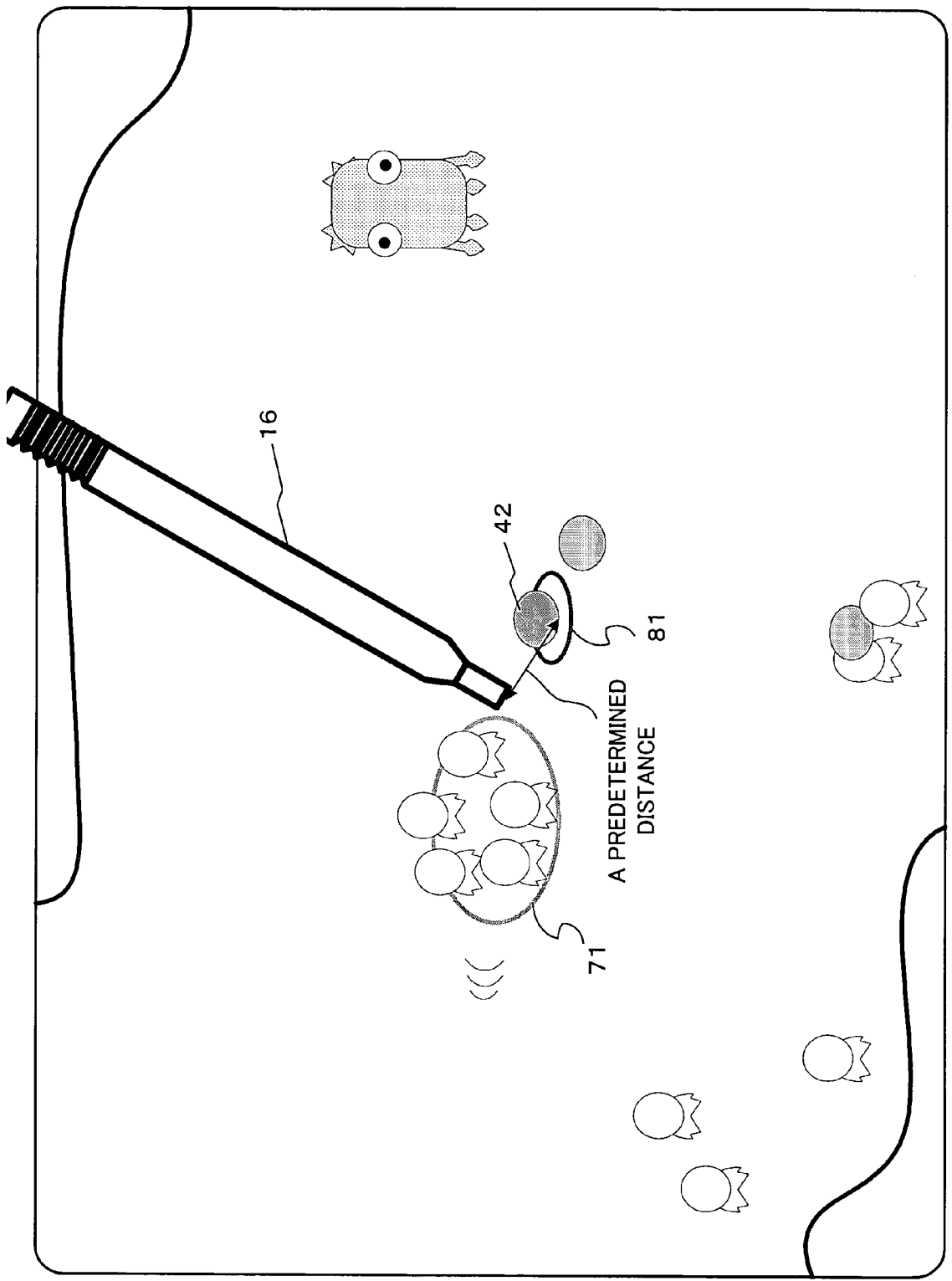
Figure 11:
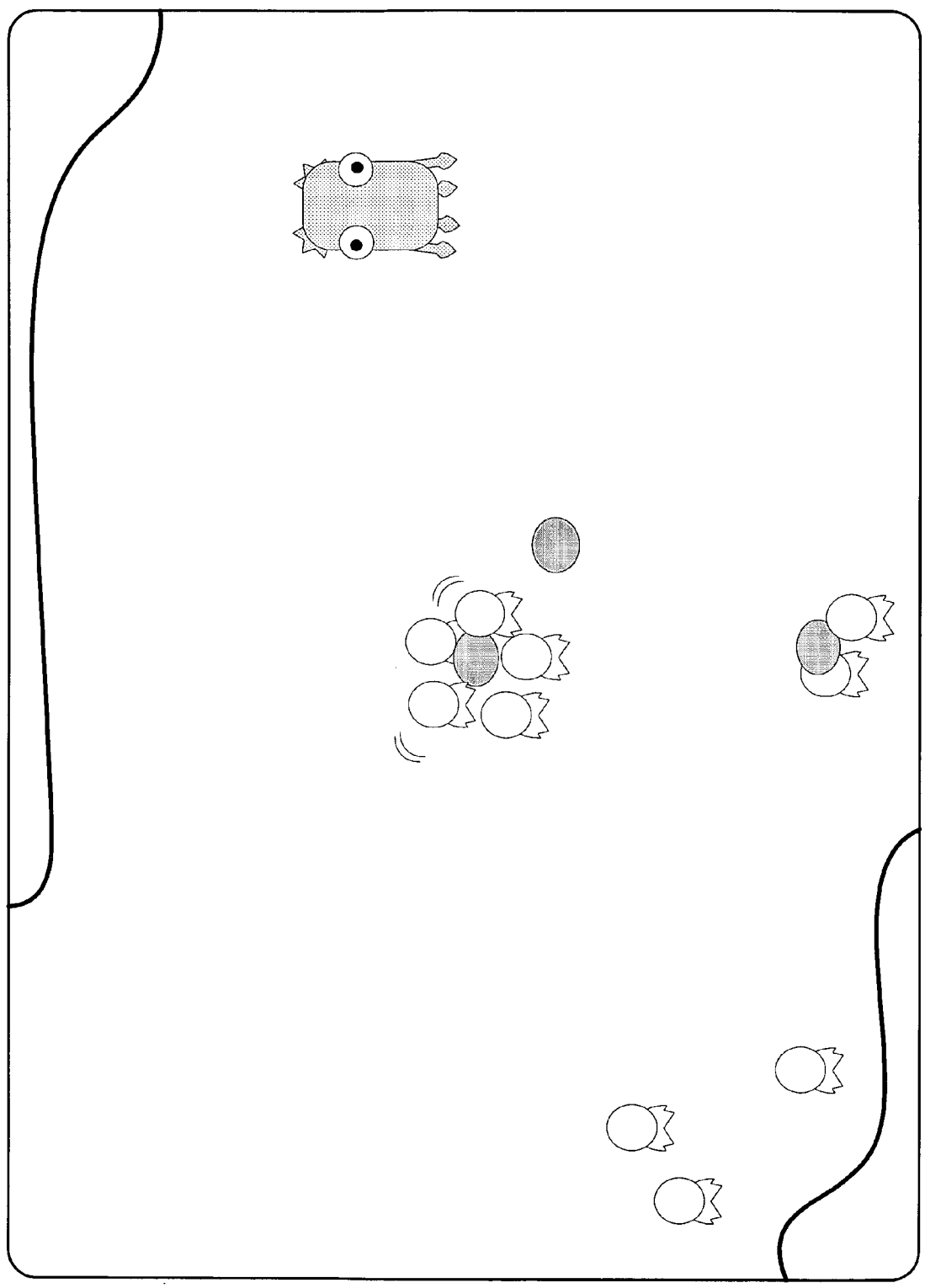
FIG. 11 is a diagram illustrating a state of the player characters carrying to their base the locked-on food 42.
Figure 12:
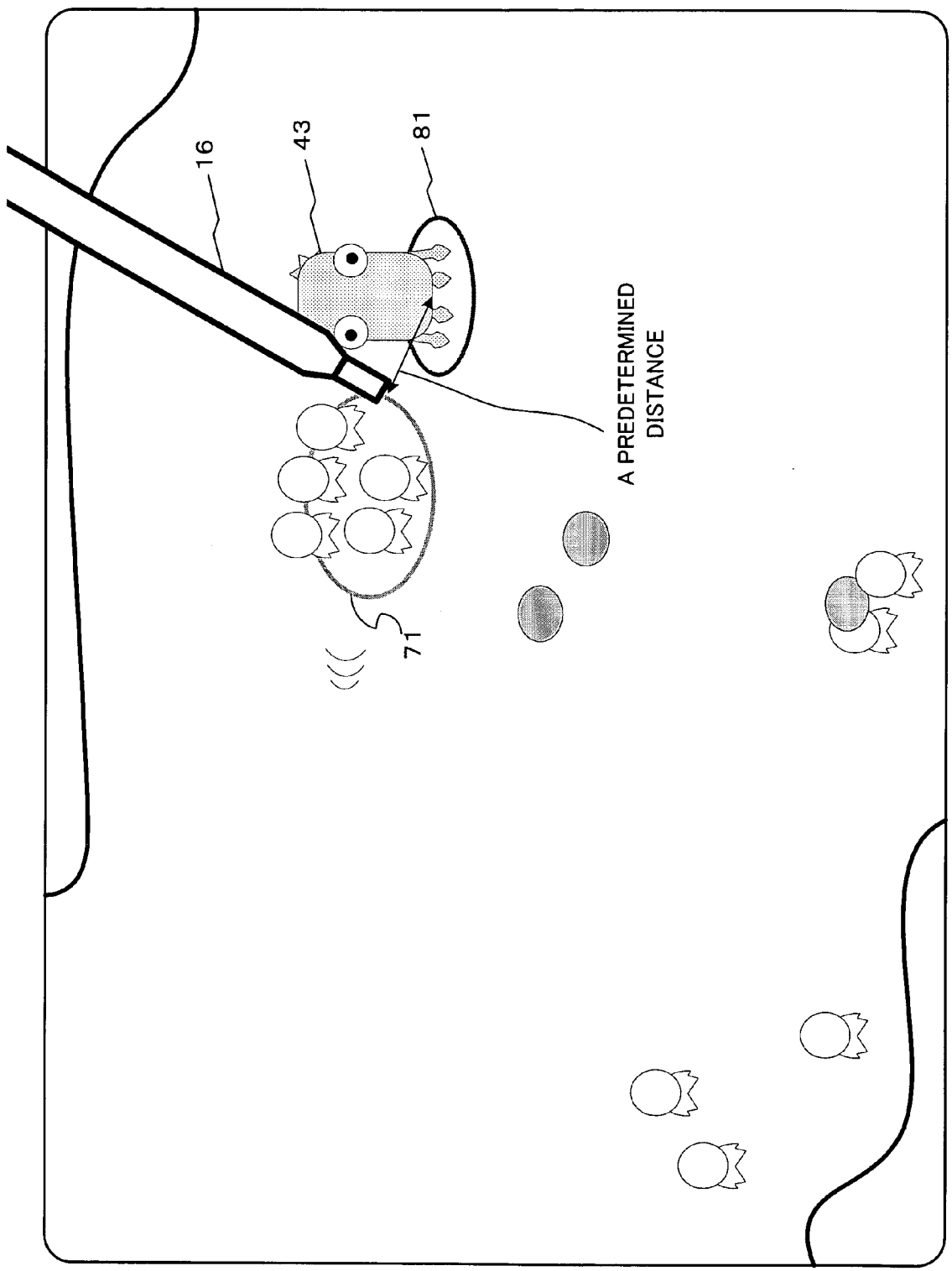
Figure 13:
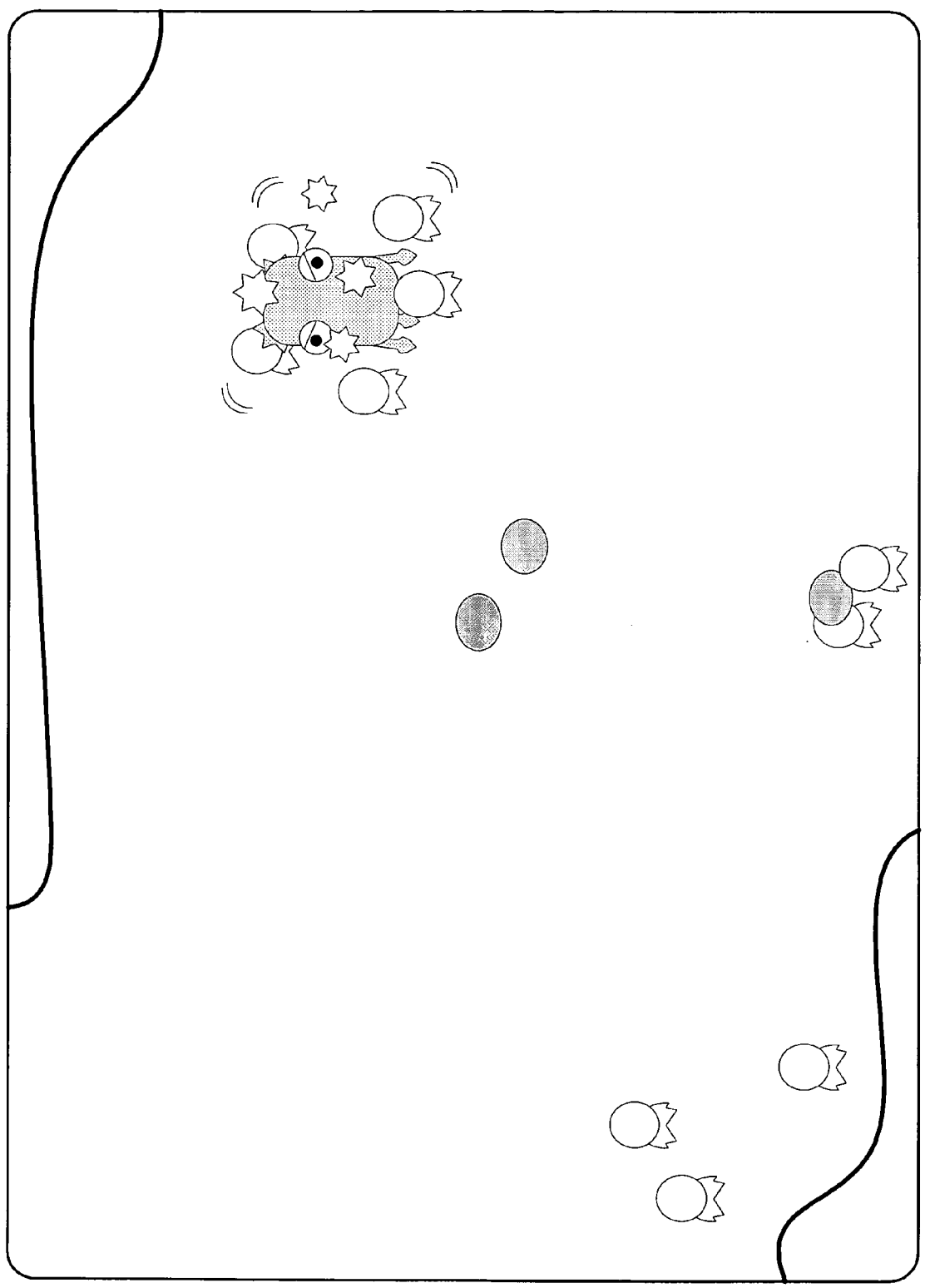
FIG. 13 is a diagram illustrating a state of the opponent character 43 being attacked.
Figure 14:
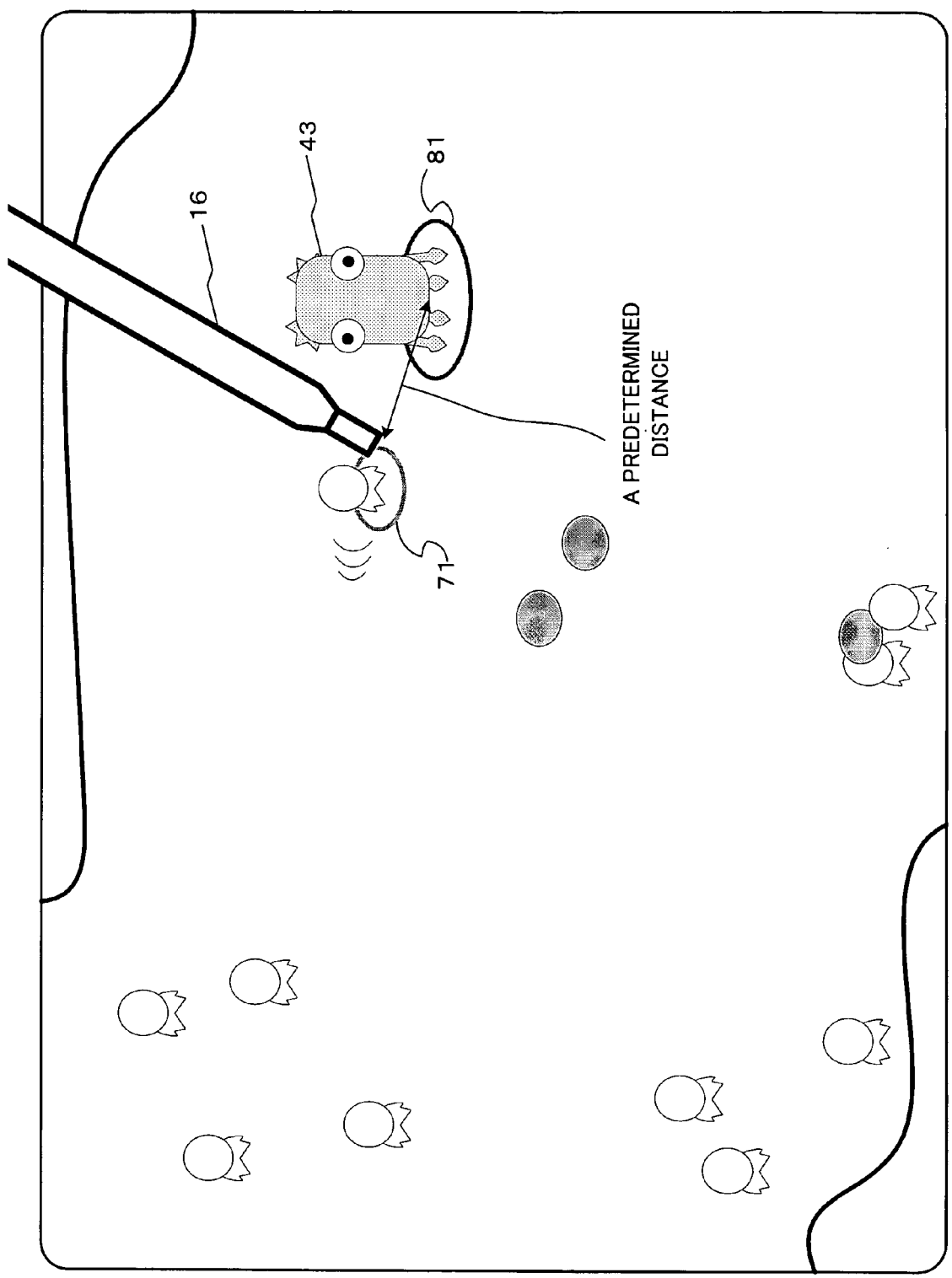
Figure 15:
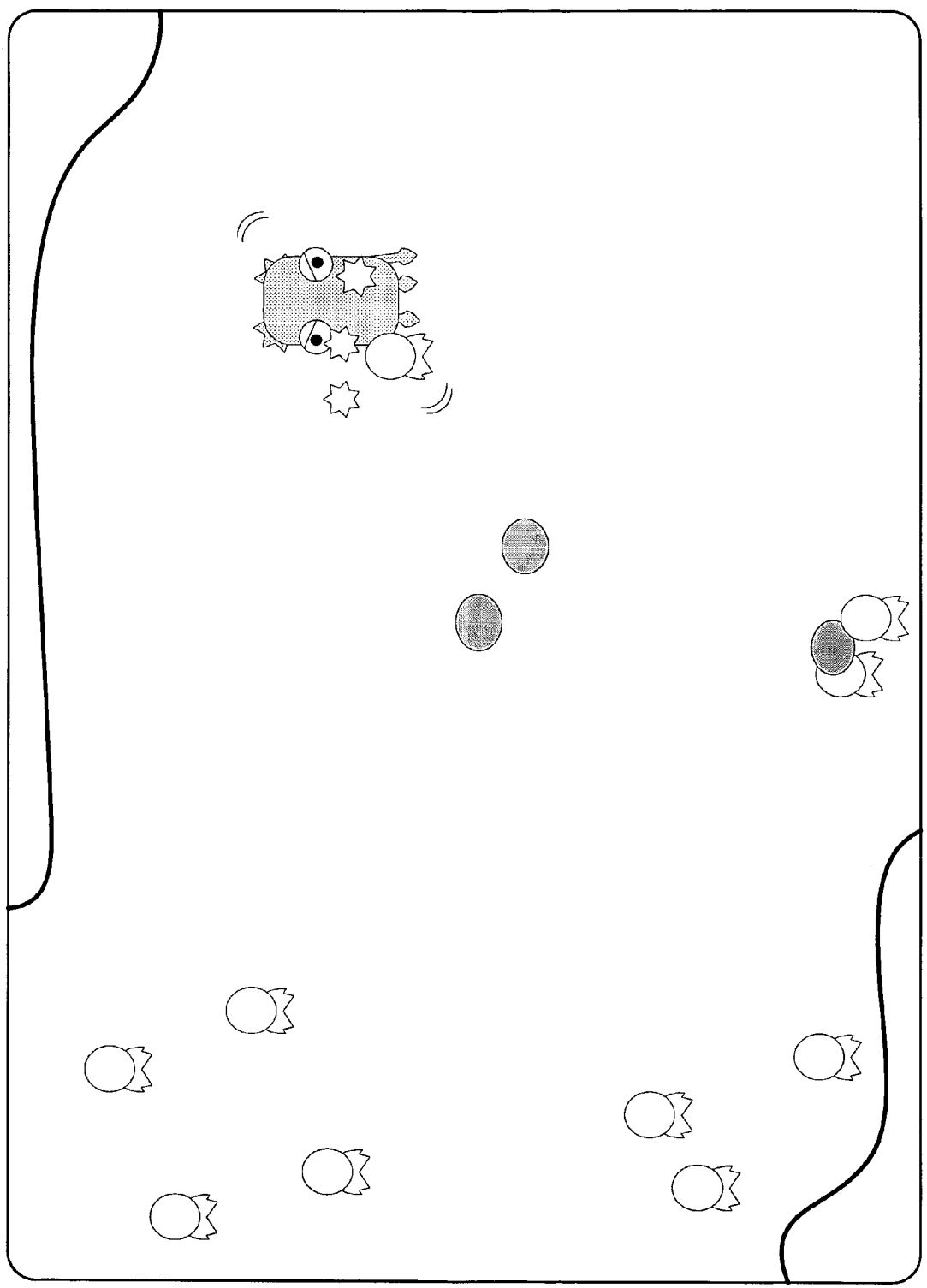
FIG. 15 is a diagram illustrating a state of the opponent character 43 being attacked.

Further, in the present embodiment, when the focus characters are caused to perform the "task", it is necessary to designate an object on which the "task" is performed, that is, a target on which the "task" is performed (hereinafter, referred to as a task target). The method for designating the task target includes a way for designating the task target without performing an explicit instruction operation and a way for directly designating the task target. Initially, with reference to FIGS. 10 to 15, a description of a method for designating the task target without performing an explicit instruction operation will be given. Firstly, when during movement of the array a position touched by the stick 16 is moved so as to approach a predetermined object in the game world, the object (food 42) is surrounded (marked) by a green circle 81 (hereinafter, referred to as a target circle) for display as shown in FIG. 10. The target circle 81 indicates that the object is designated (locked on) as the task target. Hereinafter, a state in which the object is surrounded by the target circle 81 is referred to as a lock-on state. When the player removes the stick 16 from the touch panel (hereinafter, referred to as touch off operation) in the lock-on state, the array (that is, the focus character group of the array) perform a predetermined action on an object being in the lock-on state. FIG. 11 is a diagram illustrating a state in which the player characters are carrying the locked-on food 42 to their base (which is outside the screen in FIG. 11). FIG. 12 is a diagram illustrating a state of the opponent character 43 being locked on. In this case, when touch off operation is performed, the focus characters forming an array start to attack the opponent character 43 as shown in FIG. 13. Further, FIGS. 14 and 15 are diagrams illustrating a state of an opponent character being locked on and a state of the array of a single focus character attacking the opponent character, respectively.

Figure 16:
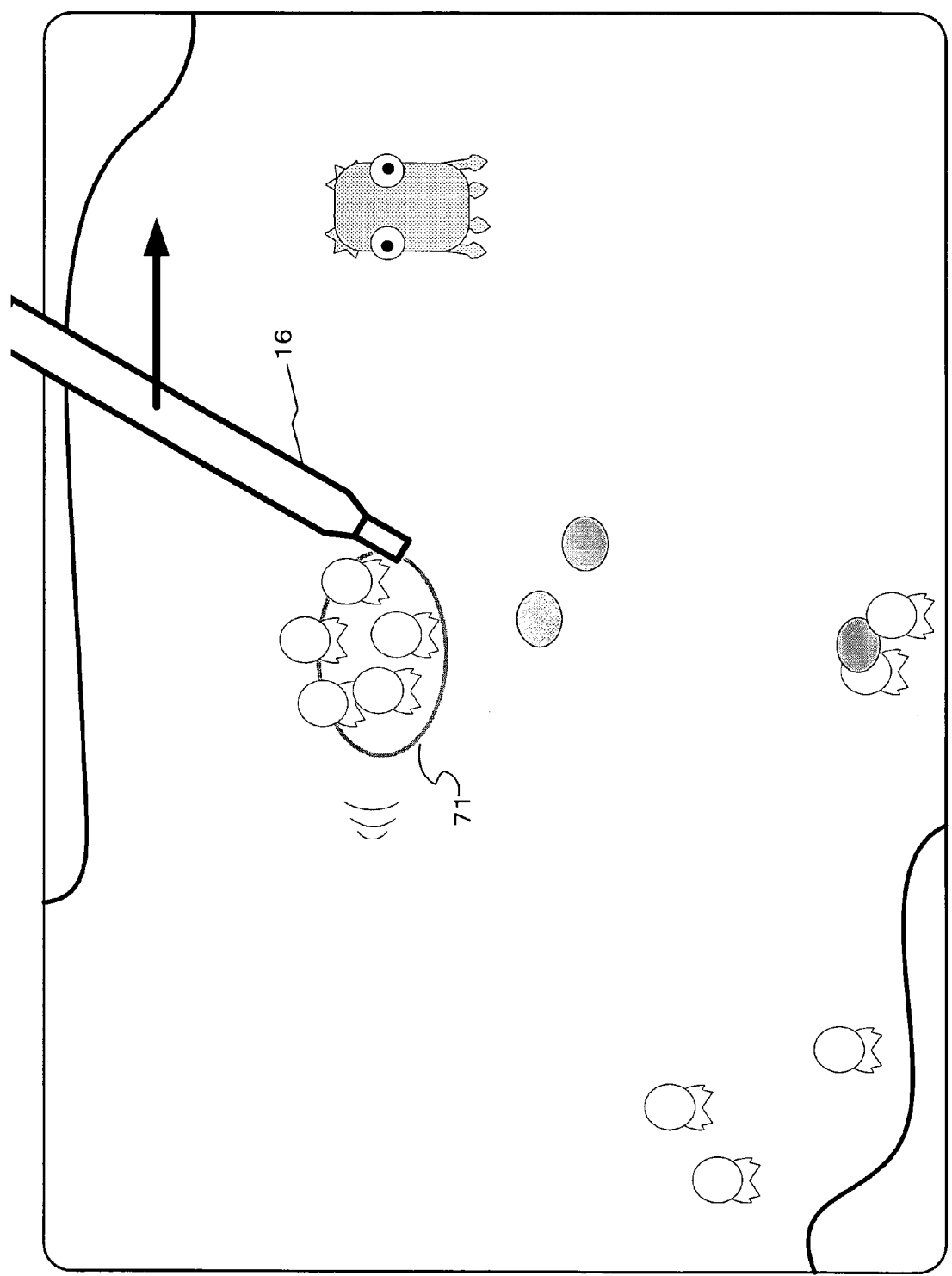
FIG. 16 is a diagram illustrating a state of the player characters being moved.
Figure 17:
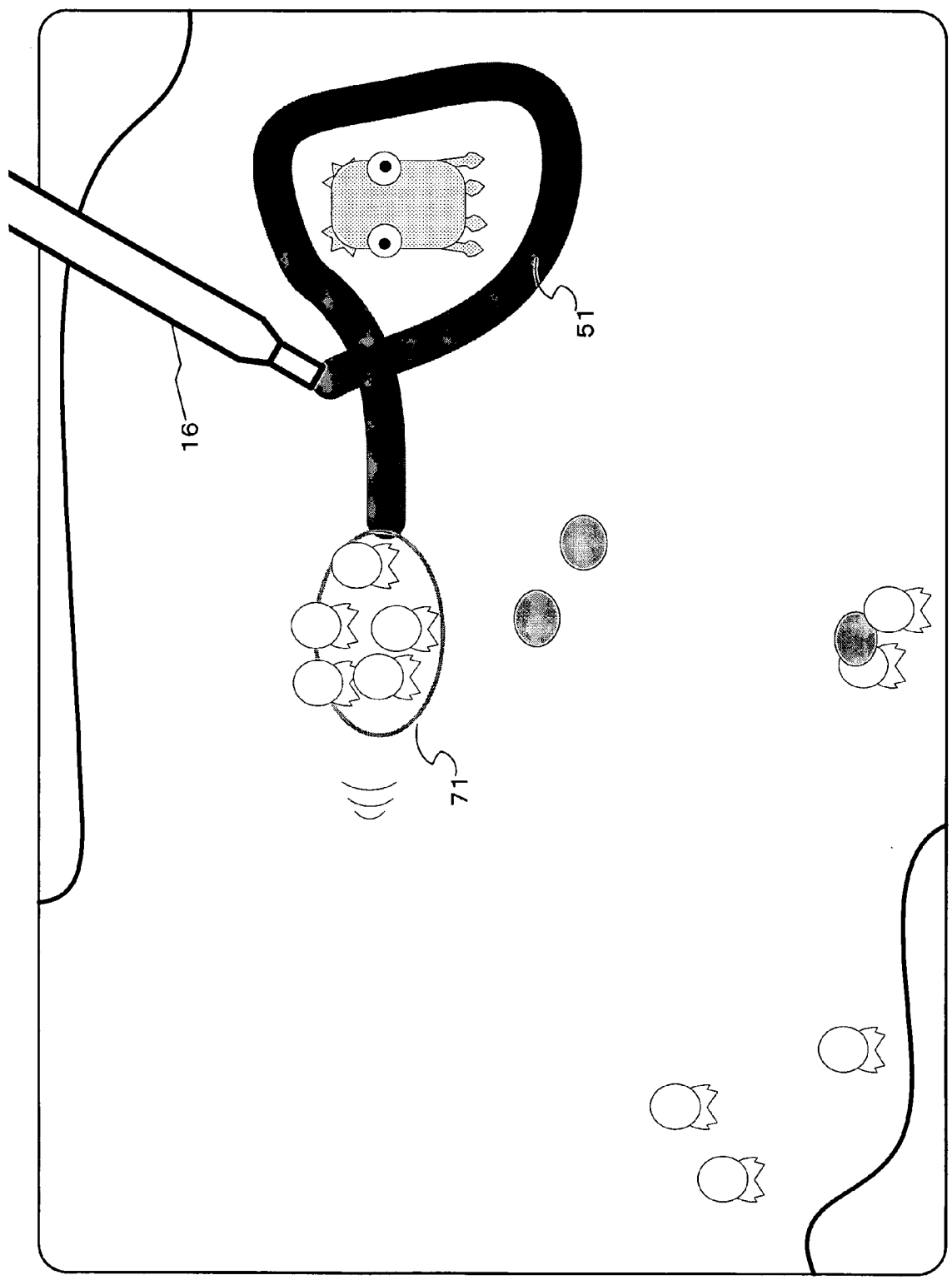
FIG. 17 is a diagram illustrating an operation of surrounding the opponent character 43 with a stick 16 touching a touch panel.
Figure 18:
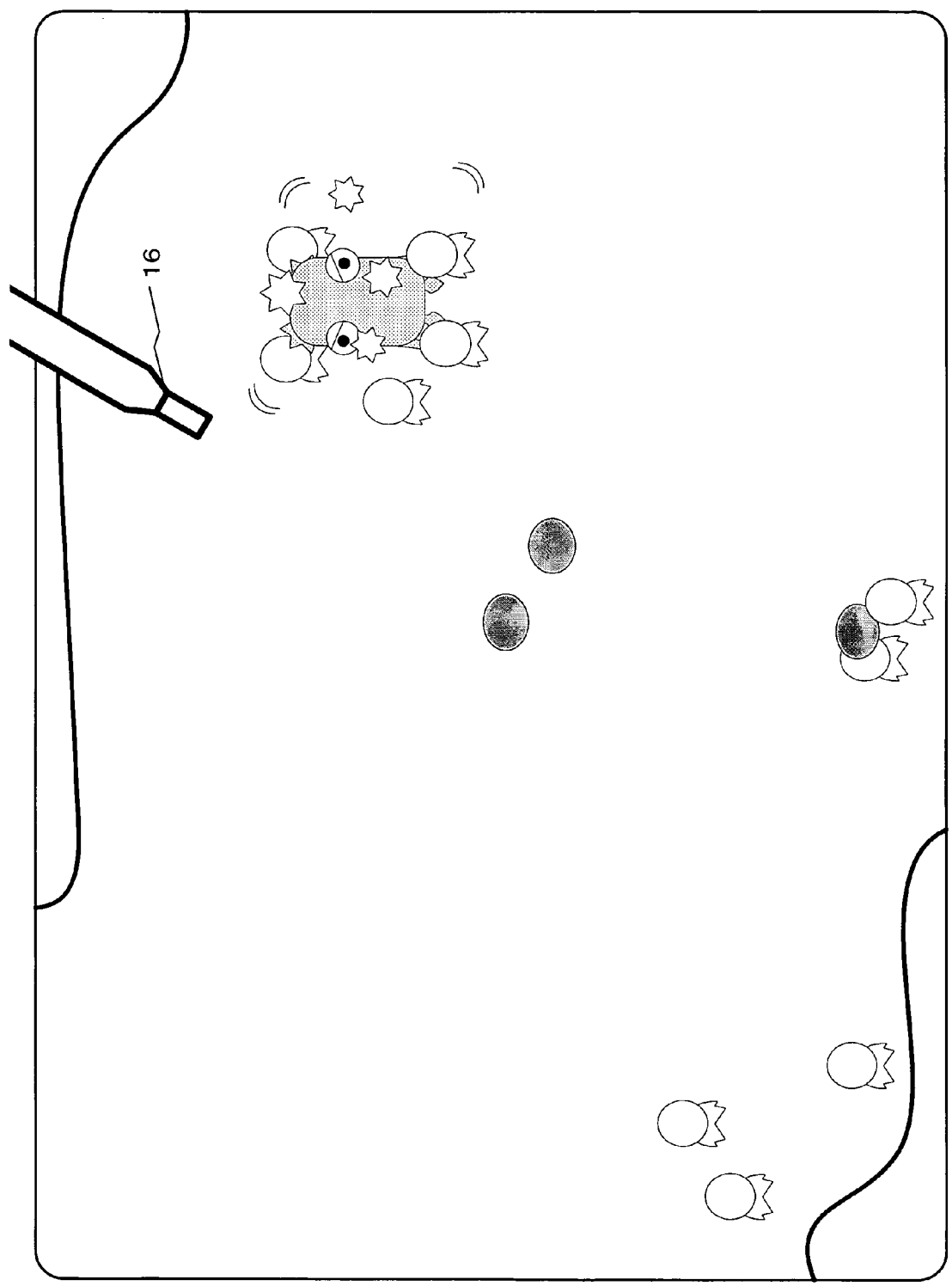
FIG. 18 is a diagram illustrating a state of the opponent character 43 being attacked.

Next, with reference to FIGS. 16 to 18, a description of a case where a task target is directly designated will be given. FIG. 16 is a diagram illustrating a state of the player characters being moved as described above. When in this state a predetermined object is surrounded using the stick 16 which is touching the touch panel, a predetermined "task" on the object is started. FIG. 17 is a diagram illustrating an operation of surrounding the opponent character 43 using the stick 16 touching the touch panel. In this case, as shown in FIG. 18, attack on the opponent character 43 will be started without performing touch-off operation.

Thus, in the present embodiment, two methods for designating the task target are used, that is, a method for performing touch-off operation so as to start the "task" and a method for directly surrounding and designating the task target with the array being moved so as to start the "task".

Further, an input track indication 51 (a thick line shown in FIG. 5) indicating an input track is displayed on the game screen. The input track is indicated at a position on the display screen corresponding to a position at which an input is made on the touch panel 15. That is, an input track indication 51 is displayed at positions to which the player's finger has actually been moved on the touch panel 15. FIG. 5 shows that the input track is near-circular. When seeing the input track indication 51, the player can clearly and intuitively recognize the input track made by the player's input operation. Accordingly, the player can quickly recognize whether or not the player character 41 and the like are appropriately surrounded.

Figure 19:
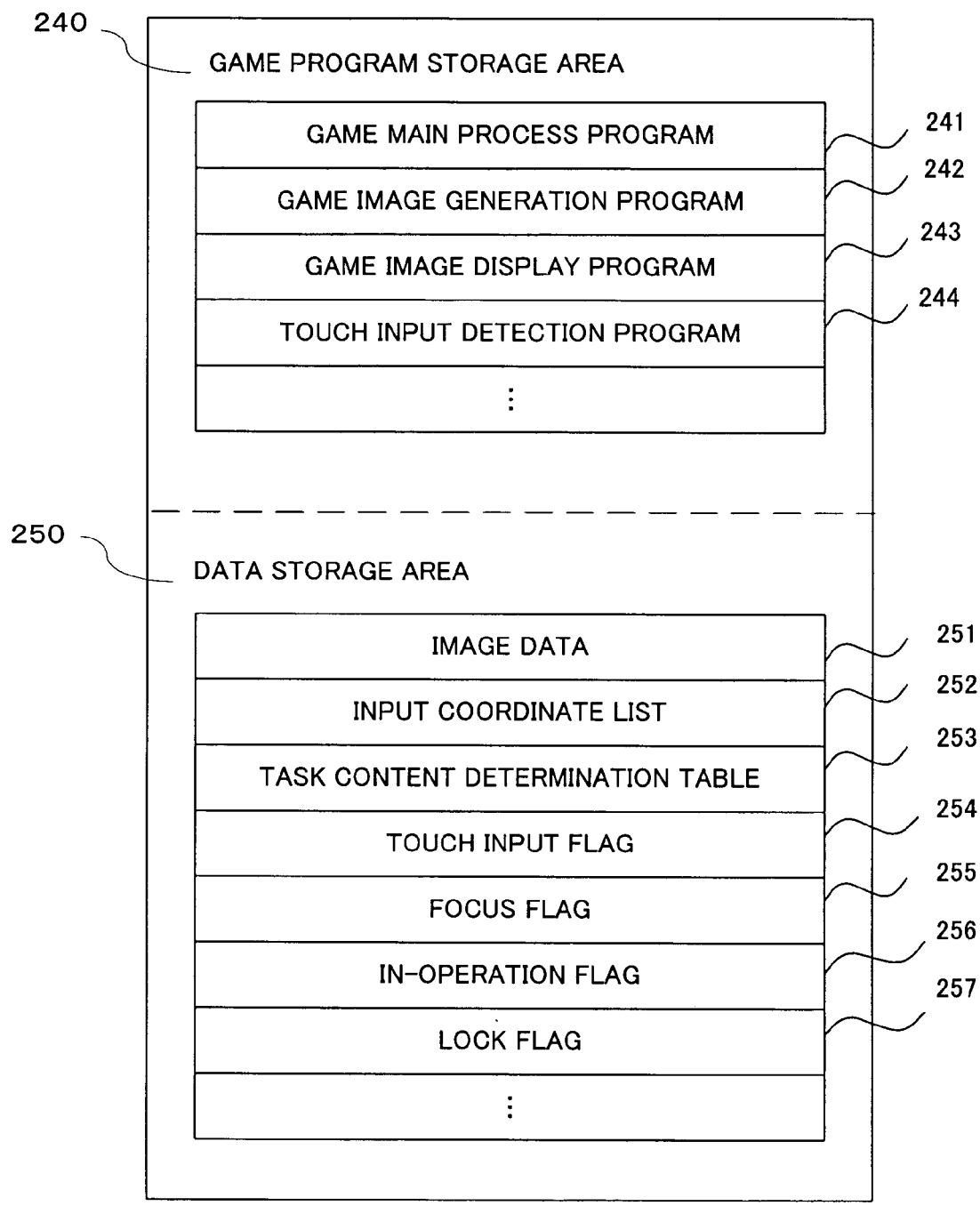
FIG. 19 is a diagram illustrating a memory map of a RAM 24 shown in FIG. 2.

Next, a description of data to be stored in the RAM 24 during the game process will be given. FIG. 19 is a diagram illustrating a memory map in the RAM 24 shown in FIG. 2. In FIG. 19, the RAM 24 includes a game program storage area 240 and a data storage area 250. The game program storage area 240 stores a game program executed by the CPU core 21. The game program includes: a game main process program 241; a game image generation program 242; a game image display program 243; and a touch input detection program 244.

The game main process program 241 is a program for processing the aforementioned game main routine. The game image generation program 242 is a program for generating game images such as the player character 41, the opponent character 43, a non-player character other than the opponent character and a background object, by using the image data 251 described below. The game image display program 243 is a program for displaying the game images generated by the game image generation program 242 on the first LCD 11 and the second LCD 12.

Figure 20:
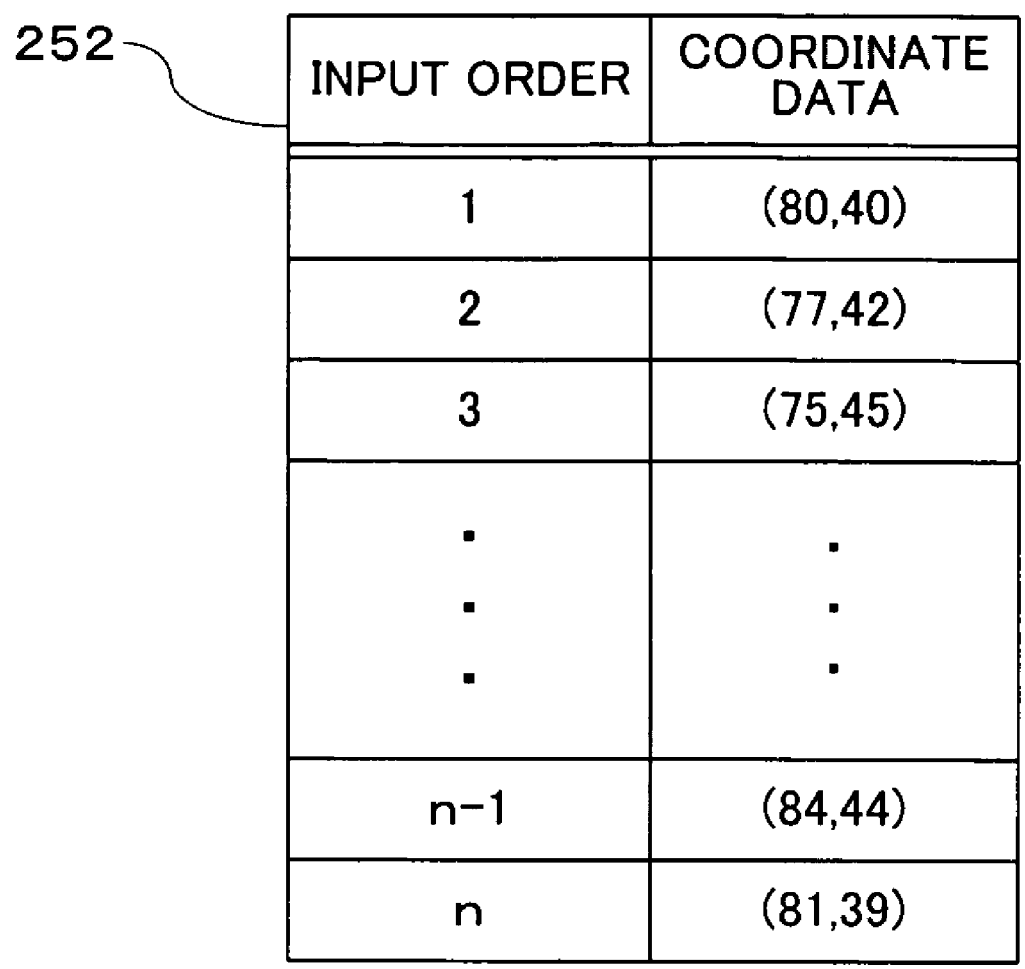
FIG. 20 is a diagram illustrating an example of an input coordinate list 252.

The touch input detection program 244 detects whether or not a player is making a touch input at regular time intervals (for each frame in the present embodiment) so as to control whether the touch input flag 254 described below is to be set as ON or OFF. The touch input detection program 244 is also a program for (temporarily) storing, when a touch input is being made, coordinate data corresponding to coordinates detected according to the touch input in an input coordinate list 252 in order of time as shown in FIG. 20. Here, whether or not the touch input is being made is determined according to whether or not the coordinate data corresponding to the coordinates detected from the touch input is being inputted from the touch panel 15.

The game program storage area 240 stores a sound reproduction program, a backup program and the like, which are not shown. The sound reproduction program is a program for reproducing a sound required for the game by using sound data. The backup program is a program for storing (saving), in the RAM 24 of the memory card 17, data (in-progress data or result data of the game) generated according to progress of the game in accordance with an instruction from a player or at a predetermined time (event).

The data storage area 250 stores data such as image data 251, an input coordinate list 252, and a task content determination table 253, and flags such as a touch input flag 254, a focus flag 255, an in-operation flag 256, and a lock flag 257.

The image data 251 is data, such as polygon data and texture data, used for generating game images such as a player character, a non-player character like an opponent character, a background object, and a predetermined character.

The input coordinate list 252 is a collection of groups each including an input order and the coordinate data. In the present embodiment, coordinate data inputted by a player is detected at intervals of a predetermined unit time. As shown in FIG. 20, the coordinate data is stored in the RAM 24 as a list while the player is continuously making inputs, that is, when the player's finger or the like is not removed from the touch panel.

The task content determination table 253 is a table used for determining, based on a type of a locked-on object, a content of a task to be actually performed. As shown in FIG. 21, the task content determination table 253 is a collection of groups each including a type of an object and content of the task process.

The touch input flag 254 is a flag indicating a touch input state "ON" or "OFF", the touch input state switching between "ON" and "OFF" according to the touch input detection program 244. In the present embodiment, the touch input flag 254 is represented by a one-bit register. When the touch input is ON, a data value of the register is set as "1", and when the touch input is OFF, the data value of the register is set as "0".

The focus flag 255 is a flag indicating a focus character which is designated from among a plurality of player characters 41 displayed on the screen, that is, a character which acts according to a player's operation. Therefore, each player character has its focus flag 255 set as "ON" or "OFF". The player character designated as a focus character by a player has its focus flag 255 set as "ON" while the player character which is not designated as a focus character by a player has its focus flag 255 set as "OFF". Further, the characters having their focus flags 255 set as "ON" form an array. That is, the characters each having its focus flag 255 set as "ON", which form an array, are surrounded by the instruction waiting circle 61.

The in-operation flag 256 is a flag indicating whether or not any operation is being performed on the focus characters. When the in-operation flag 256 is set as "ON", the operation circle 71 is displayed instead of the instruction waiting circle 61. When the in-operation flag 256 is set as "OFF", a player is not controlling the focus character.

The lock flag 257 is a flag indicating that an object which is within a predetermined distance from input coordinates detected finally before a touch-off operation is designated (locked on) as a task target. Therefore, each object has its lock flag 257 set as "ON" or "OFF". The lock flag 257 of the locked-on object is set as "ON" while the lock flag 257 of the object which is not locked on is set as "OFF".

FIG. 22 shows a table providing a listing of contests of the respective flags. The data storage area 250 stores sound data used for outputting a sound required for the game, data generated according to progress of the game such as in-progress data or result data of the game, a flag such as an event flag, and the like, which are not shown.

Figure 23:
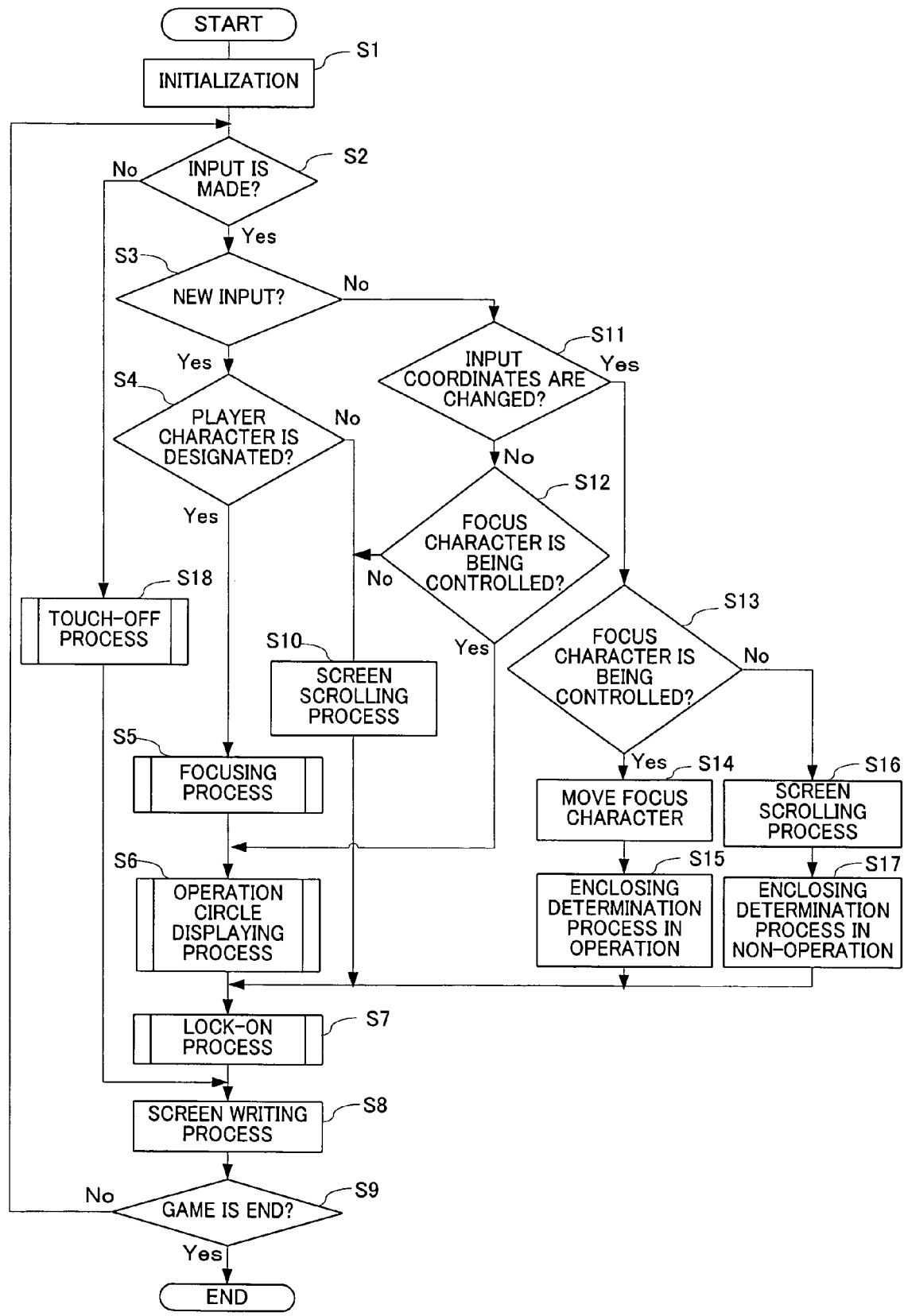
FIG. 23 is a flow chart illustrating a flow of a game process executed by the game apparatus 10.

Next, with reference to FIGS. 23 to 27, a description of a flow of the game process executed by the game apparatus 10 will be given. FIG. 23 is a flow chart illustrating a flow of the game process executed by the game apparatus 10. When the power supply of the game apparatus 10 is turned on, the CPU core 21 of the game apparatus 10 executes a boot program stored in the boot ROM not shown so as to initialize each unit such as the RAM 24. The game program stored in the memory card 17 is loaded to the RAM 24, and the execution of the game program is started. Consequently, a game image is displayed on the first LCD 11 via the first GPU 26, thereby starting the game in step S1. One cycle of the game process shown in FIG. 23 is executed in one frame. A frame rate is 30 fps.

Next, it is detected in step S2 whether or not a touch input is being made. That is, coordinate data inputted from the touch panel 15 is detected for. As a result, when it is detected that no touch input is being made (No in step 2), the touch-off process described below is performed in step S18. On the other hand, when it is detected that touch input is being made (Yes in step S2), the touch input position (hereinafter, referred to as an input coordinate position) is stored in the input coordinate list 252. That is, the coordinate data inputted from the touch panel 15 is temporarily stored in the input coordinate list 252 in order of time. In the subsequent step S3, it is determined whether or not the touch input flag is set as "ON", that is, whether the touch panel is being kept pressed (hereinafter, referred to as continuous input) or pressing on the touch panel has just started (hereinafter, referred to as new input).

When a determination result of step S3 is a new input (Yes in step S3), it is determined whether or not any player character 41 displayed on the screen is designated in step S4. For making the description easier, a description of a case where a single player character is designated will be given. In step S4, it is determined whether or not any player character 41 is designated according to whether or not an input coordinate position is within a hit determination area for the player character 41. The hit determination area is previously defined in the initialization process.

When it is determined in step S4 that no player character 41 is designated (No in step S4), a screen scrolling process is performed in step S10. In step S10, the screen is scrolled so as to position the input coordinate position at the center of the screen.

Figure 24:
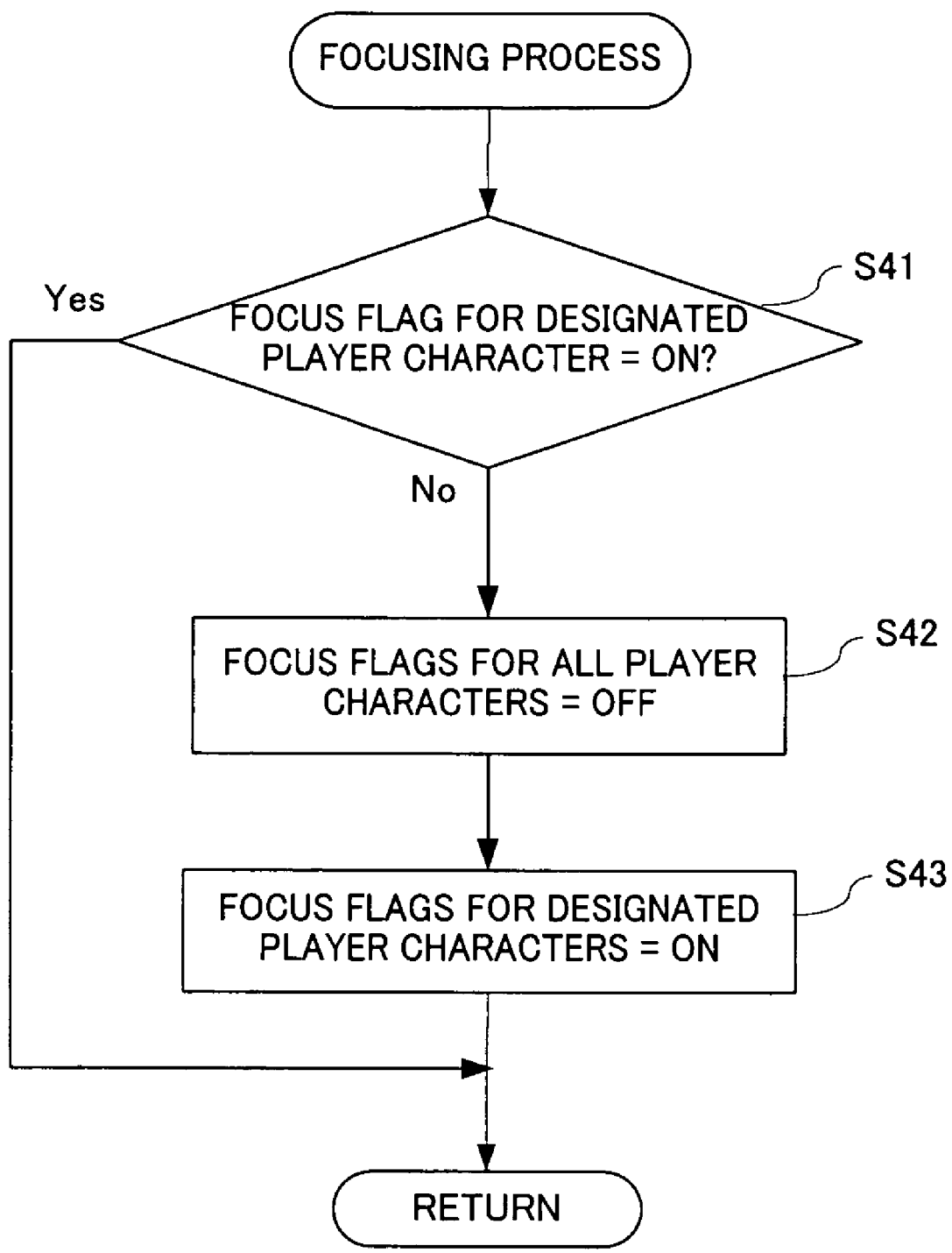
FIG. 24 is a flow chart illustrating in detail a focusing process of step S5 shown in FIG. 23.

On the other hand, when it is determined in step S4 that a player character 41 is designated (Yes in step S4), the focusing process is performed so as to set the player character 41 as the focus character in step S5. FIG. 24 is a flow chart illustrating in detail the focusing process of step S5. Here, the focus flag 255 is set as "ON" so as to set the player character 41 as the focus character.

In FIG. 24, initially, it is determined whether or not the focus flag 255 for the designated player character is set as "ON" in step S41. When it is determined that the focus flag is set as "OFF" (No in step S41), the focus flags for all the player characters 41 are set as "OFF" in step S42. This is because some player characters may have their focus flags 255 set as "ON", and therefore the focus flags 255 for all the player characters 41 are reset to "OFF", that is, all the designations are cancelled. Next, the focus flag 255 for the designated player character 41 is set as "ON" in step S43. Thereby, even when some player characters 41 have already been designated as the focus characters, only the player character 41 which is currently designated can be designated as the focus character. On the other hand, when it is determined in step S41 that the focus flag 255 has already been set as "ON" (Yen in step S41), the focusing process is ended.

Figure 25:
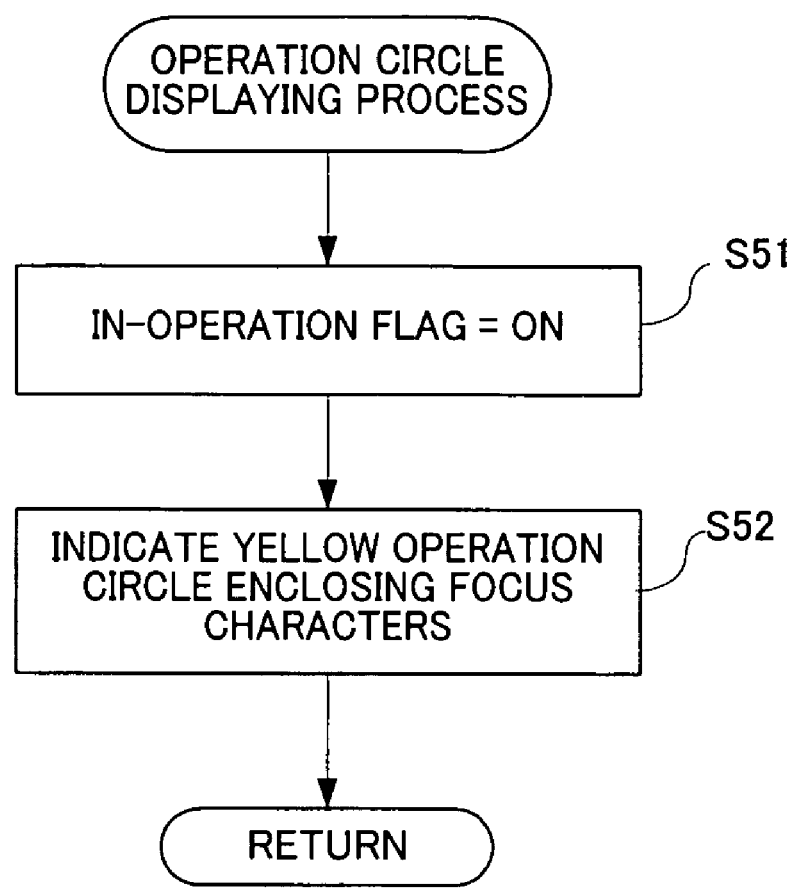
FIG. 25 is a flow chart illustrating in detail an operation circle displaying process of step S6 shown in FIG. 23.

Returning to FIG. 23, a process of displaying the operation circle 71 indicating that the focus character is being controlled is performed in step S6. FIG. 25 is a flow chart illustrating in detail an operation circle displaying process of step S6. In FIG. 25, initially, the in-operation flag 256 is set as "ON" in step S51. Next, the operation circle 71 having the focus character at the center thereof is generated in step S52. This is the end of the operation circle displaying process.

Figure 26:
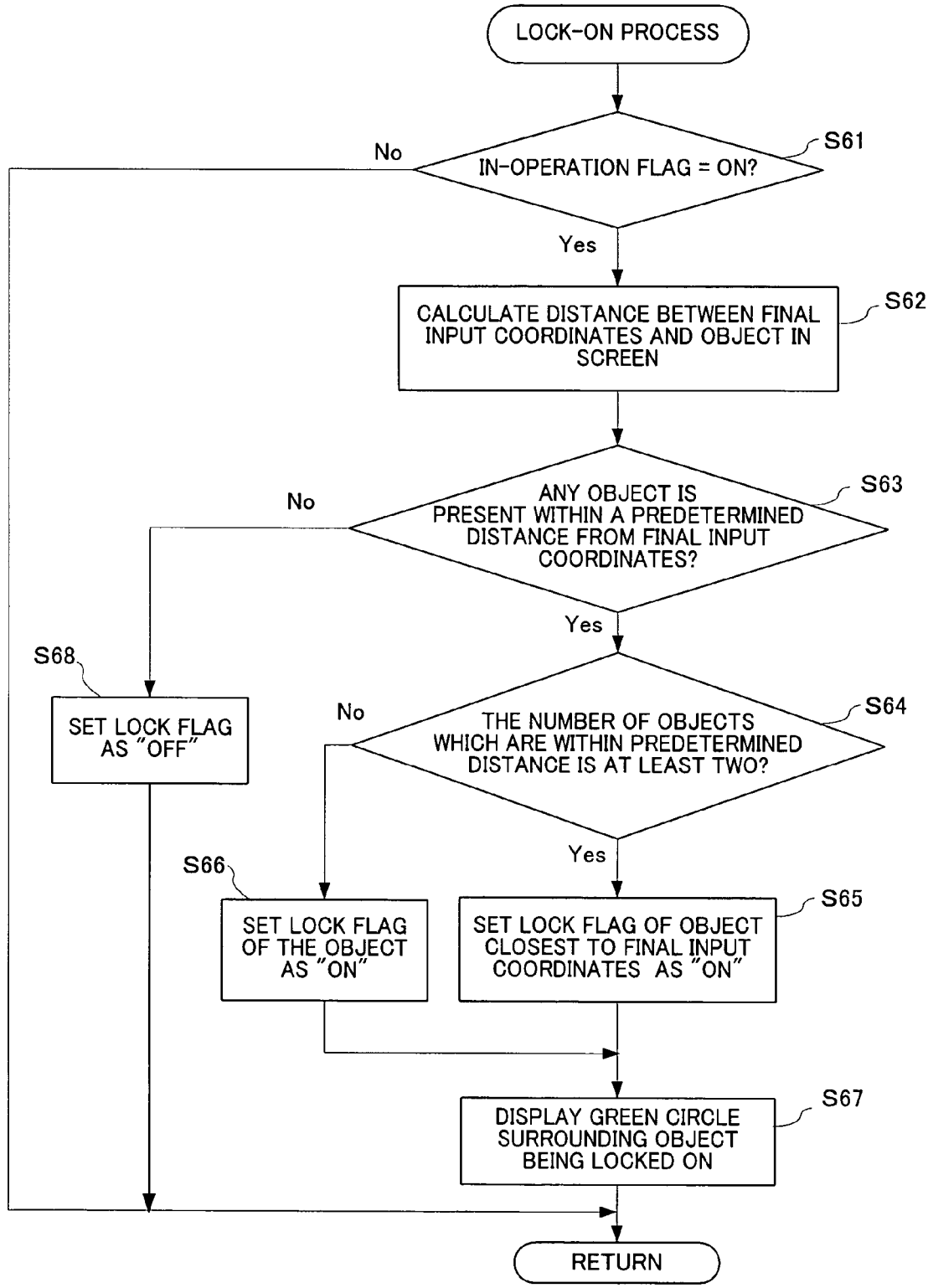
FIG. 26 is a flow chart illustrating in detail a lock-on process of step S7 shown in FIG. 23.

Returning to FIG. 23, in step S7, the lock-on process is performed subsequent to the process of step S6. As shown in FIG. 14, the lock-on process is a process of designating (locking on), as a task target, an object which is within a predetermined distance from a touch position of the stick 16. FIG. 26 is a flow chart illustrating in detail the lock-on process of step S7. In FIG. 26, initially, it is determined whether or not the in-operation flag 256 is set as "ON" in step S61. When it is determined that the in-operation flag 256 is set as "OFF" (No in step S61), the player is not touching the touch panel 15, that is, no instruction is being given, and therefore the lock-on process is ended. In other words, when the player is not controlling focus characters, no object is locked on regardless of whether or not a distance between the object and input coordinates detected finally before a touch-off operation have a value smaller than a predetermined value.

On the other hand, when the in-operation flag 256 is set as "ON" (Yes in step S61), a distance between each object displayed on the screen (including an opponent and a non-player character) and a touch position of the stick 16 is calculated in step S62. The distance is calculated, for example, based on coordinates of each object and the n-th coordinate data (hereinafter, referred to as final input coordinates) in the input coordinate list 252 shown in FIG. 20. Next, it is determined whether or not any object is within a predetermined distance from the final input coordinates in step S63. When it is determined that no object is within the predetermined distance from the final input coordinates (No in step S63), if there is an object having its lock flag 257 set as "ON", the lock flag 257 of the object is set to "OFF", that is, lock-on state is cancelled, in step S68. When the target circle 81 described below is displayed, the target circle 81 is erased. This is the end of the lock-on process.

On the other hand, when it is determined in step S63 that one or more objects are within a predetermined distance from the final input coordinates (Yes in step S63), it is determined whether the number of the objects is at least two or not in step S64. When it is determined that the number of objects is at least two (Yes in step S64), the lock flag 257 for the object which is closest to the final input coordinates is set as "ON" in step S65. On the other hand, when the number of objects is less than two, that is, the number of objects is one (No in step S64), the lock flag 257 for the object is set as "ON", that is, the object is locked on, in step S66. That is, the number of object to be locked on is one. For example, two opponent characters near the final input coordinates are moved without the stick 16 being moved, thereby changing the distance between the final input coordinates and the opponent character closest to the final input coordinates. Even in this case, the opponent character closest to the final input coordinates can be locked on. That is, when one opponent character closest to the final input coordinates is locked on and thereafter the other opponent character approaches the final input coordinates so as to be closest to the final input coordinates of the two opponent characters, the other opponent character can be locked on while the lock-on state of the one opponent character is cancelled.

Next, the target circle 81 having, at the center thereof, the locked-on object, is generated in step S67. Thereby, as shown in FIG. 14, the locked-on object, which is surrounded by the target circle 81, can be displayed. Therefore, a player can visually recognize a locked-on object. This is the end of the lock-on process.

Returning to FIG. 23, a description of a process performed when the continuous input is detected in step S3 (No. in step S3) will be given. In this case, initially, the final input coordinates are compared with the input coordinate detected immediately before the final input coordinates are detected so as to determine whether or not the stick 16 has been moved. This determination is made according to whether or not the n-th coordinate data of the input coordinate list 252 is different from the (n−1)th coordinate data of the input coordinate list 252 in step S11. When it is determined that there is no change in input coordinates (No in step S11), it is determined whether the in-operation flag 256 is set as "ON" or "OFF" in step S12. When it is determined that the in-operation flag 256 is set as "OFF" (No in step S12), the screen is scrolled so as to position the input coordinate position at the center of the screen in step S10. On the other hand, when it is determined that the in-operation flag 256 is set as "ON" (Yes in step S12), the process is advanced to step S6.

On the other hand, when it is determined in step S11 that there is a change in input coordinates (Yes in step S11), it is determined whether the in-operation flag 256 is set as "ON" or "OFF" in step S13. When it is determined that the in-operation flag 256 is set as "ON" (Yes in step S13), the focus character is moved in step S14. In the process, as shown in FIG. 9, the focus character is moved to the final input coordinates. Thereafter, while the focus character is being moved, a surrounding determination process (step S15) is performed. In the surrounding determination process, it is determined whether or not any object to be surrounded is directly designated so as to perform a predetermined process such as forming an array. Thereafter, the process is advanced to the lock-on process of step S7.

On the other hand, when it is determined in step S13 that the in-operation flag 256 is set as "OFF" (No in step S13), the screen is scrolled in step S16 so as to position input coordinates at the center of the screen. Thereafter, the surrounding determination process is performed for determining whether or not any object to be surrounded is directly designated so as to perform a predetermined process in step S17. Thereafter, the process is advanced to the aforementioned lock-on process of step S7. The surrounding determination process in steps S15 and S17 is not directly related to the present invention, and a detailed description is not given.

Returning to FIG. 23, when the lock-on process in step S7 is ended, a screen writing process is performed in step S8. Thereby, the respective objects and the like having been moved are displayed at positions at which the respective objects and the like have stopped. Further, the operation circle 71, the target circle 81, and the like are displayed. Thereafter, in step S9, it is determined whether or not the game is ended. When the game end condition is not satisfied (No in step S9), steps S2 to S17 and step S18 described below are repeated until it is determined that the game is ended. On the other hand, when the game end condition is satisfied (Yes in step S9), the game process is ended.

Figure 27:
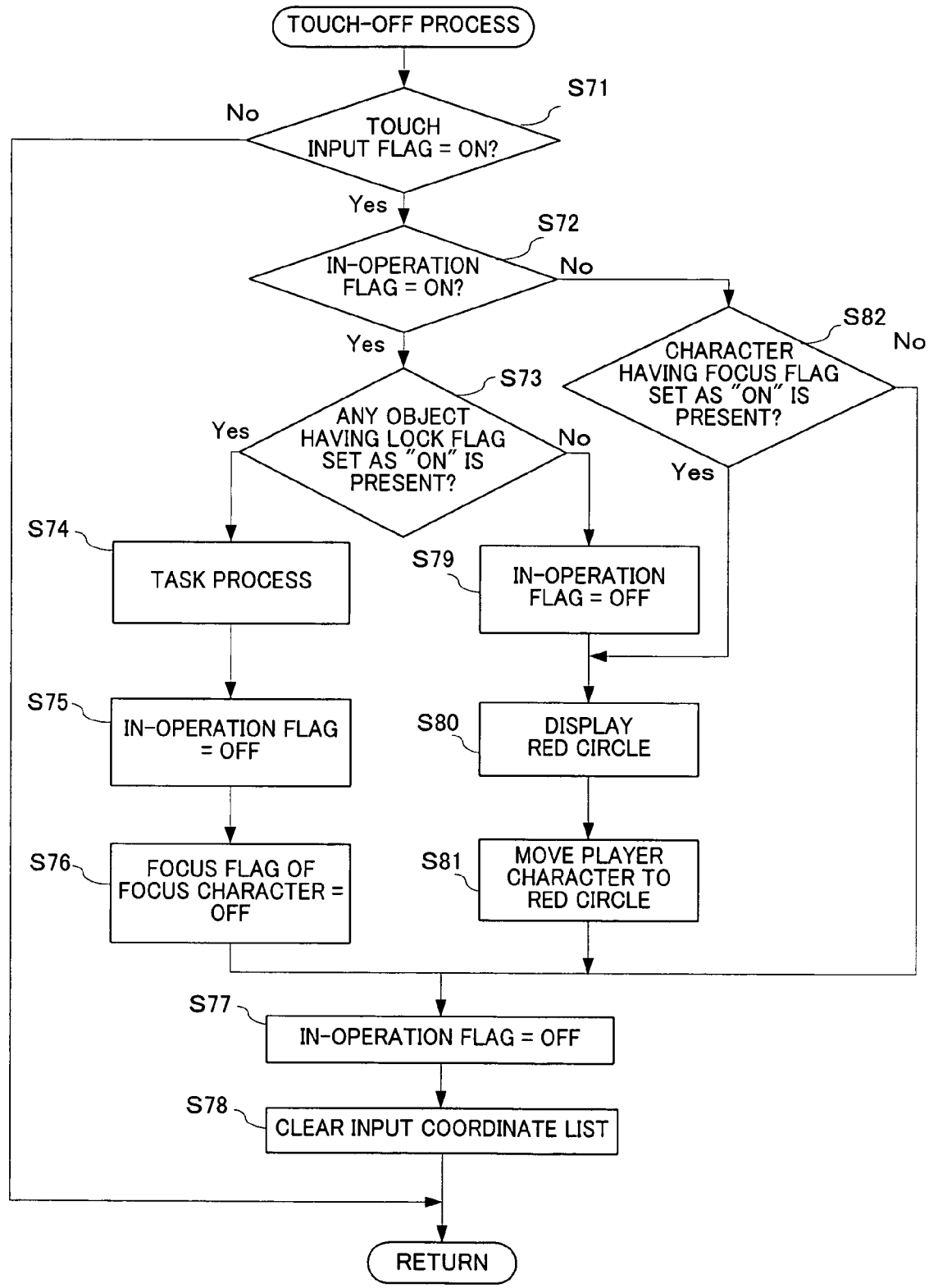
FIG. 27 is a flow chart illustrating in detail a touch-off process of step S18 shown in FIG. 23.

Next, a description of a process (step S18) performed when it is determined in step S2 that touch input is not made (No in step S2) will be given. The process is performed when the stick 16 is removed from the touch panel 15, that is, when a touch-off is made. FIG. 27 is a flow chart illustrating in detail touch-off process of step S18. In FIG. 27, initially, it is determined whether or not the touch input flag 254 is set as "ON" in step S71. When it is determined that the touch input flag 254 is set as "OFF" (No in step S71), the touch-off process is ended. That is, when the touch input flag 254 is set as "OFF", the touch panel 15 has been kept untouched.

On the other hand, when the touch input flag 254 is set as "ON" (Yes in step S71), it is determined whether or not the in-operation flag 256 is set as "ON" in step S72. This process is performed so as to determine whether or not the touch panel 15 having been touched has just been touched off. When it is determined that the in-operation flag 256 is set as "ON", that is, when the focus character is being moved (Yes in step S72), it is determined whether or not any object has its lock flag 257 set as "ON", that is, whether or not any object has already been locked-on in step S73. When it is determined that some object has already been locked-on (Yes in step S73), the task content determination table 253 is referred to and a task process corresponding to a type of the locked-on object is started in step S74. Here, the task process is a process in which the locked-on object or the focus character exerts an effect on the other. In other words, the task process does not include a process in which no change occurs in the locked-on object, such as a process of just orienting the focus character toward the locked-on object. Specifically, as shown in FIG. 14, the task process includes a process in which, when the locked-on character is the opponent character 43, the focus character attacks the opponent character 43. That is, the focus character exerts such an effect as to reduce a parameter value of the opponent character 43, the parameter value representing a physical capacity or the like. Further, the task process includes a process of the opponent character 43 attacking the focus character. That is, the opponent character 43 exerts such an effect as to reduce a parameter value of the focus character. Further, for example, the task process includes a process in which, when the locked on object is the food 42, the focus character carries the food 42 to their base, that is, the focus character moves the food 42 (a coordinate value of the food 42 is changed). Further, the task process includes a process in which the focus flag 255 for the player character 41 which is not designated as the focus character is set as "ON" so as to add the player character to the array.

When the task process is started, the in-operation flag 256 is set as "OFF" in step S75. Further, the focus flags 255 for all the characters are set as "OFF" in step S76. This means that, once the task process is started, the focus characters of the array are released from the control of the player. As a result, for example, after the opponent character 43 is knocked down, even if no instruction is given, the player characters 41 of the array can carry the dead body of the opponent character 43 to their base. Next, the touch input flag 254 is set as "OFF" in step S77. The touch input flag 254 set as "OFF" indicates that the stick 16 is removed from the touch panel 15. The input coordinate list 252 is cleared in step S78.

On the other hand, when it is determined in step S73 that no object is locked-on (No in step S73), the in-operation flag 256 is set as "OFF" in step S79. This is because the stick 16 is removed from the touch panel 15 and therefore the operation circle 71 is prevented from being displayed. The operation circle 71 is replaced by the instruction waiting circle 61 in step S80. Subsequently, the player character 41 is moved to the instruction waiting circle 61 in step S81. This is performed, for example, in a case where when a plurality of player characters 41 form the array, and some player characters 41 in the array hit against a rock or the like during movement and get separated from other characters, the separated player characters 41 are moved back into the array. Thereafter, steps S77 and S78 are performed.

Next, a description of a process performed when it is determined in step S72 that the in-operation flag 256 is set as "OFF" (No in step S72) will be given. In this case, initially, it is determined whether or not any character (focus character) has its focus flag 255 set as "ON" in step S82. When some focus character has its focus flag 255 set as "ON" (Yes in step S82), the process is advanced to step S80. On the other hand, when no focus character has its focus flag 255 set as "ON" (No in step S82), the process is advanced to step S81. This is the end of the touch-off process of step S18 shown in FIG. 23.

Returning to FIG. 23, when the touch-off process is ended, screen writing process of step S8 is performed as described above. Subsequently, it is determined whether or not the game end condition is satisfied in step S9. When the game end condition is not satisfied (No in step S9), steps S2 to S18 are repeated until it is determined that the game is to be ended. On the other hand, when the game end condition is satisfied (Yes in step S9), the game process is ended. This is the end of the game process according to the first embodiment.

As described above, according to the present embodiment, when a player character is being controlled using the pointing device or the like, a target to be attacked, etc., can be designated without specifically performing an operation for designating an opponent character and the like. The player character can be caused to start a process for exerting an effect on the designated target at a time of a spontaneous operation being performed such as removing a finger from the pointing device or removing a finger from the touch panel. Therefore, it is unnecessary to specifically perform an operation for causing the player character to start some action using an attack button, a command set button and the like, thereby improving controllability for a player. Further, lock-on process is performed only when the player character is being controlled. Therefore, the object can be prevented from being designated against the player's intention.

In the lock-on process shown in FIG. 26, the task target may be designated using coordinates of the focus character instead of the final input coordinates. That is, in step S62, a distance between a focus character and each object such as an opponent character or a non-player character, which are displayed on the screen, is calculated based on the coordinates of the focus character and the coordinates of each object. It may be determined whether or not any object is within a predetermined distance from the focus character in step S63. In this case, when an array includes a plurality of focus characters, that is, when a plurality of player characters 41 form the array, the distance may be calculated based on the player character 41 having the focus flag set as "ON" initially in the array.

Further, in the present embodiment, in the lock-on process of step S7, when a plurality of objects are near the final input coordinates, the object closest thereto is locked on (steps S64 to S65 in FIG. 26). Therefore, for example, when two opponent characters 43 are near the final input coordinates and only the two opponent characters 43 are moved, the distance between the locked-on opponent character and the final input coordinates is changed. In this case, only the opponent character 43 closest to the final input coordinates is locked on. However, the lock-on method is not restricted thereto. In the aforementioned state, once the opponent character 43 closest to the final input coordinates is locked on, even when a distance between the final input coordinates and the locked-on opponent character 43 is changed due to the opponent characters 43 being moved when the stick 16 is not being moved, the target to be locked on may not be changed. Thereby, a player will not be confused with the target to be locked on being frequently changed when multiple objects are near the final input coordinates.

Moreover, in the aforementioned embodiment, a locked-on object is surrounded by the target circle 81 and displayed as described above. A shape or a color of the target circle 81 may be changed depending on a type of the locked-on object. For example, when the locked-on object is an opponent object, the target circle 81 may be shaped as a rectangle, and when the food is locked on, the target circle 81 may be shaped as a triangle. Thereby, the player can easily and intuitively recognize the type of the locked-on object.

Second Embodiment

Figure 28:
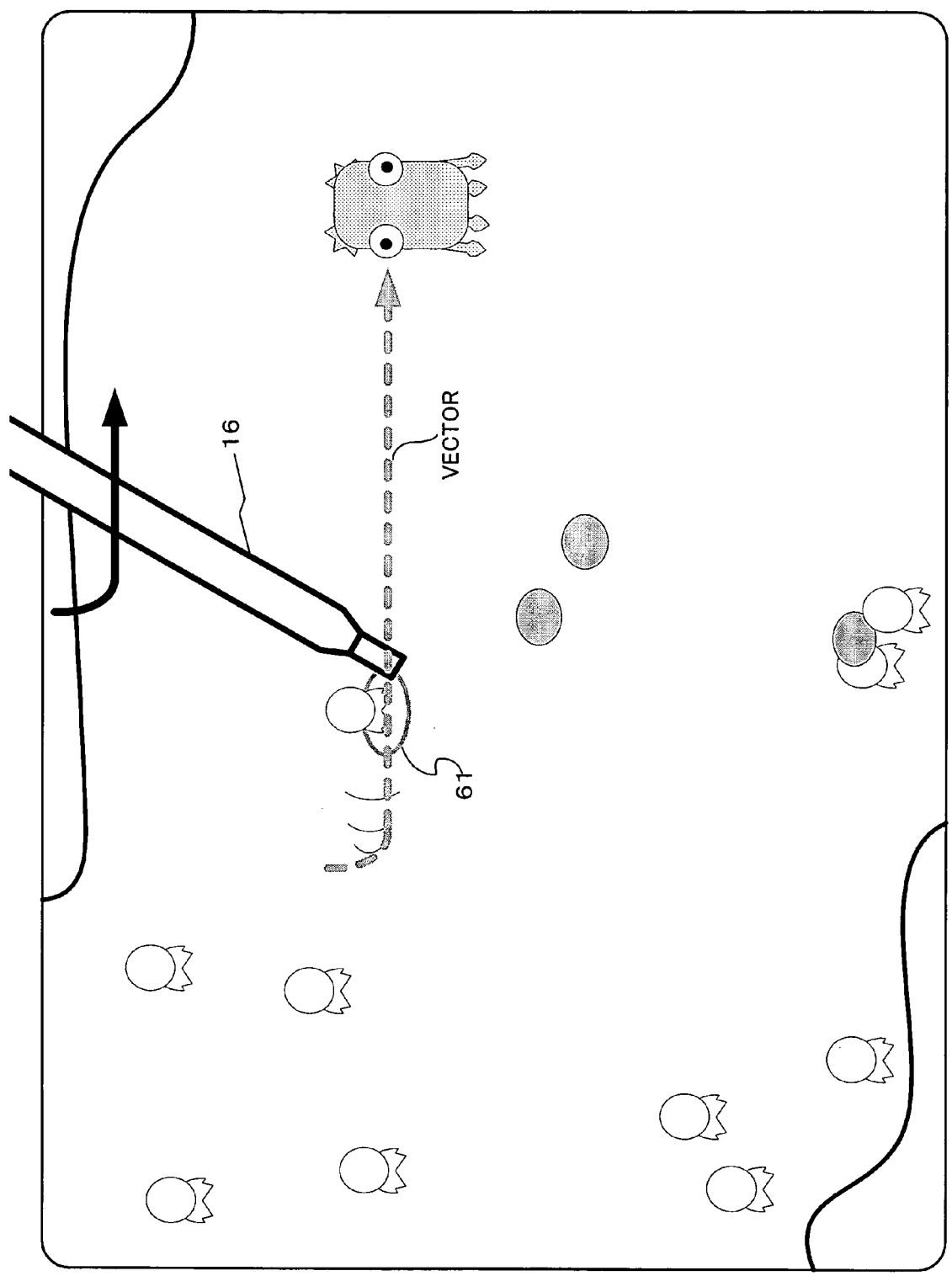
FIG. 28 is a diagram illustrating a state in which an object is in the direction toward a destination to move a focus character toward.

With reference to FIGS. 28 to 32, a second embodiment of the present invention will be described. In the first embodiment, locked on is an object which is away from final input coordinates by a distance having a value smaller than a predetermined value and the focus character being controlled starts a task on the locked-on object at a time of the touch panel being touched off. On the other hand, in the second embodiment, first vector data indicating a vector of an input track of the stick 16 being controlled is calculated, and when an object is on an extended line of the vector, the aforementioned task process on the object is started even if the object is not locked on. In other words, as shown in FIG. 28, when an object is in the direction toward the input destination of the stick 16, even when a distance between the object and the touch position of the stick 16 does not have a value smaller than a predetermined value, the focus character is caused to start a task on the object at a time of the touch panel being touched off. The game apparatus 10 according to the present embodiment is the same as that described for the first embodiment. Therefore, the same reference numerals are used and a detailed description is not given. In addition, the game process according to the present embodiment is the same as that described for the first embodiment with reference to FIG. 23 except the touch-off process including steps S83 and S84. Therefore, a detailed description of only the touch-off process including steps S83 and S84 will be given.

Figure 29:
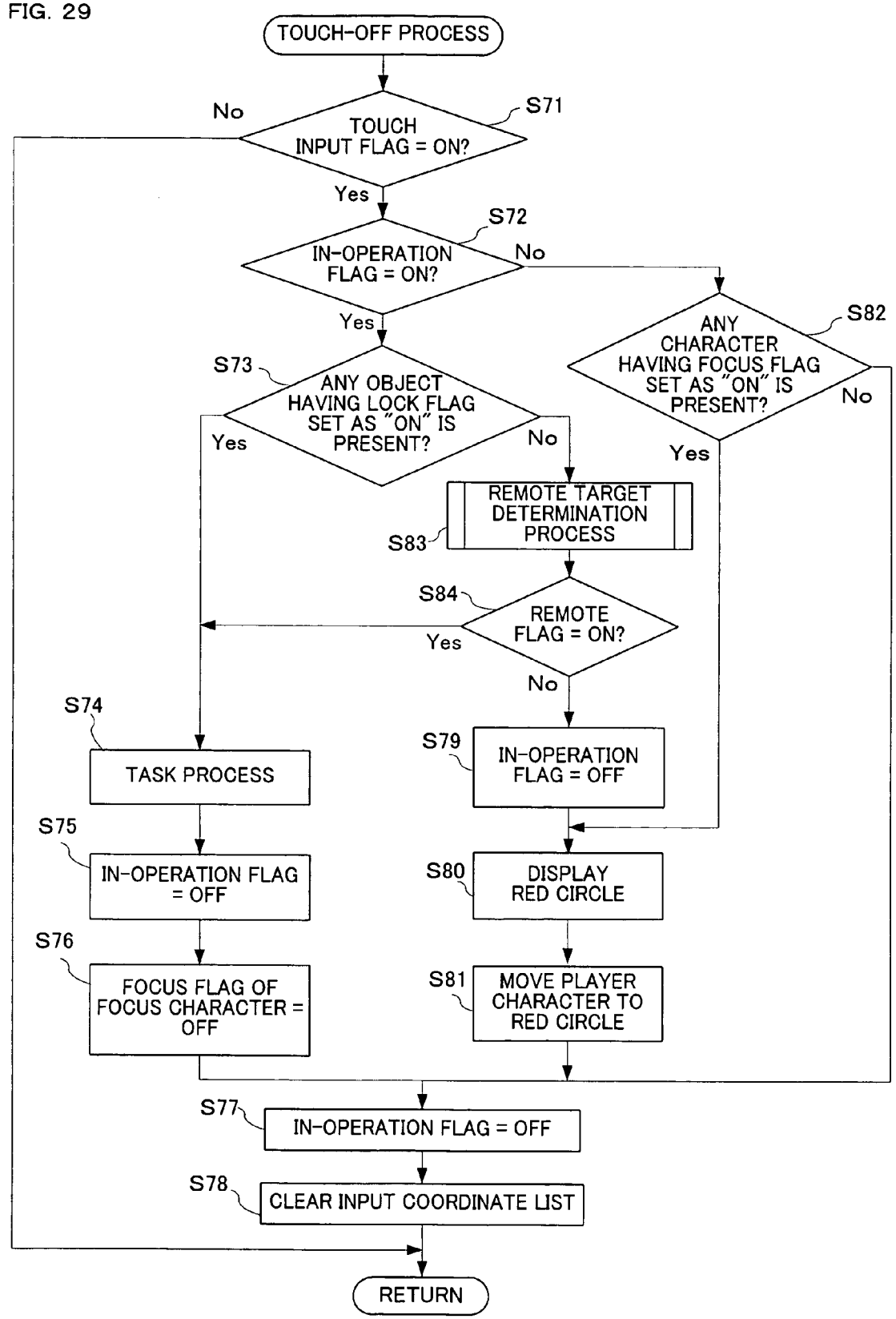
FIG. 29 is a flow chart illustrating in detail a touch-off process (corresponding to step S18 shown in FIG. 23) according to a second embodiment of the present invention.
Figure 30C:
FIG. 30C is a schematic diagram illustrating vector data having been inputted.
Figure 30B:
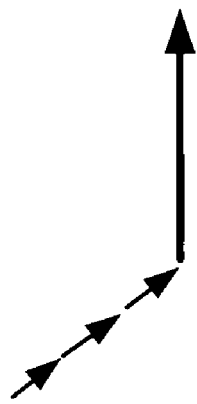
FIG. 30B is a schematic diagram illustrating vector data having been inputted.
Figure 30A:
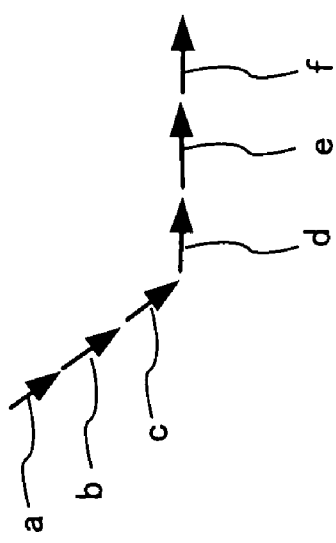
FIG. 30A is a schematic diagram illustrating vector data having been inputted.

FIG. 29 is a flow chart illustrating in detail a touch-off process (corresponding to step S18 shown in FIG. 23) according to the second embodiment. The touch-off process according to the second embodiment includes steps S83 and S84 in addition to the touch-off process described for the first embodiment with reference to FIG. 27, and the steps of the touch-off process other than steps S83 and S84 are the same between the first embodiment and the second embodiment. Therefore, the steps other than steps S83 and S84 are denoted by the same reference numerals and a detailed description is not given. For making the description easier, a description of a case where an input operation is performed as shown in FIG. 30(A) will be given. In FIG. 30(A), vector data a to f each represents a vector connecting detected points adjacent to each other.

In FIG. 29, it is determined whether or not any object is locked on in step S73. When it is determined that no object is locked on, a remote target determination process is performed in step S83 for determining whether or not an object is in the direction of a movement destination of the stick 16.

Figure 31:
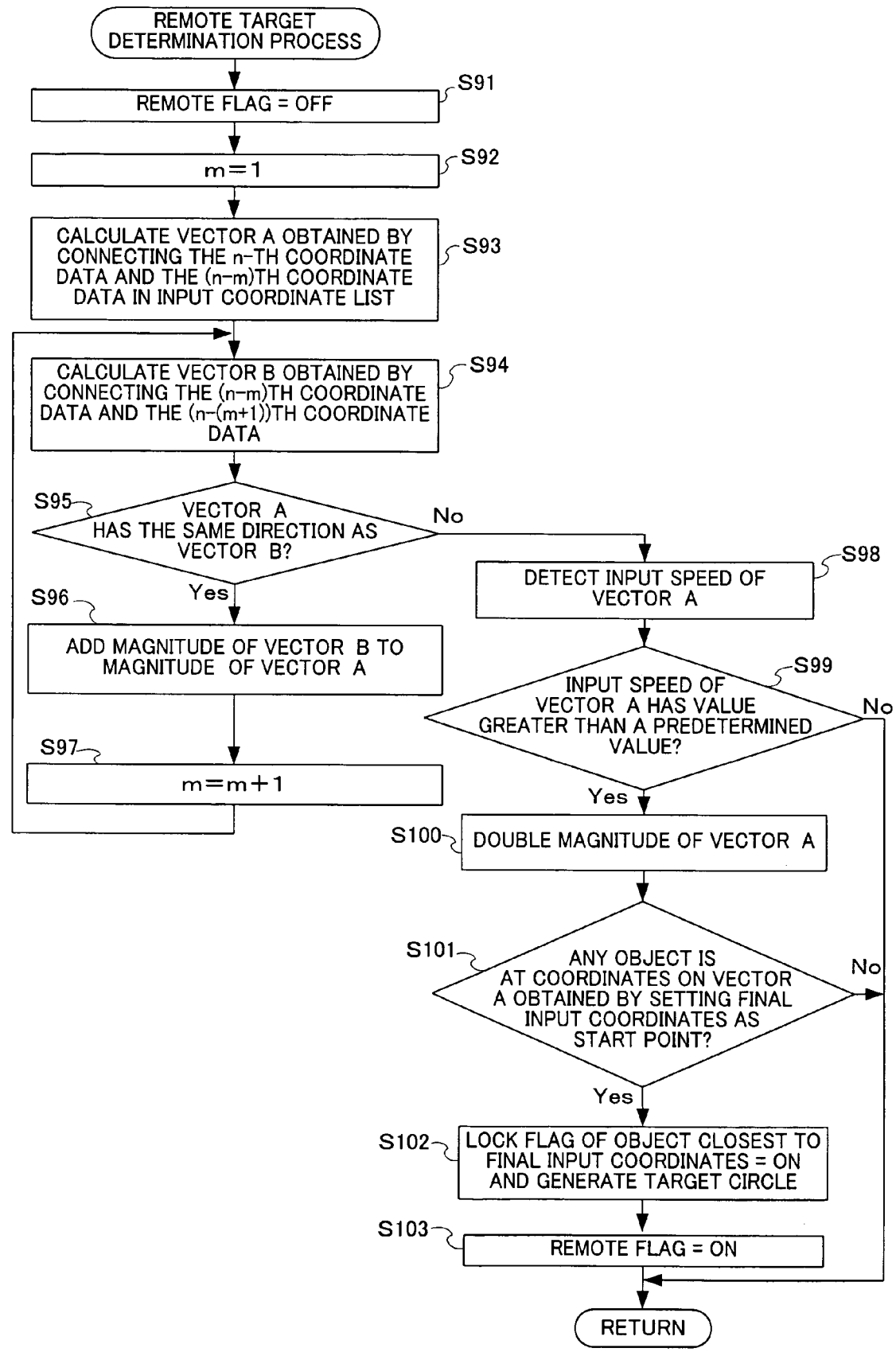
FIG. 31 is a flow chart illustrating in detail a remote target determination process of step S83 shown in FIG. 29.
Figures 32A, 32B:
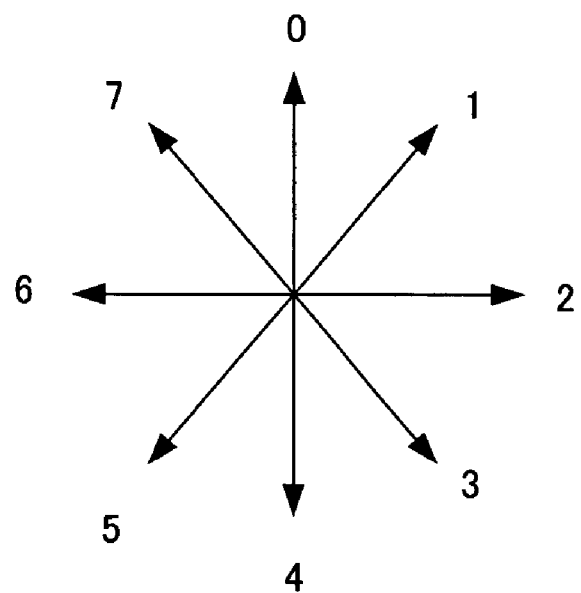
FIG. 32A is a diagram illustrating an example of vector data.
FIG. 32B is a diagram illustrating an example of vector data.

FIG. 31 is a flow chart illustrating in details a remote target determination process of step S83. In FIG. 31, initially, a remote flag indicating whether or not an object is in the direction of the movement destination of the stick 16 is set as "OFF" in step S91. Next, a variable m used for referring to the input coordinate list 252 in order starting from the final input is set as "1" in step S92. Subsequently, in step S93, calculated is a vector A (corresponding to f in FIG. 30(A)) which is obtained by setting the (n−m)th coordinate data as a start point and setting the n-th coordinate data (final input coordinates) as an end point with the input coordinate list 252 shown in FIG. 20 being referred to. Here, the vector A is a vector having a direction 321 and a magnitude 322 as shown in FIG. 32(A). As to the magnitude 322, a magnitude "1" represents a length corresponding to a few dots (for example, two dots) on the touch panel 15. On the other hand, as shown in FIG. 32(B), eight directions "0" to "7" are provided as the direction 321 for making the description easier.

Next, calculated is a vector B (corresponding to e in FIG. 30(A)) which is obtained by setting the (n−(m+1))th coordinate data as a start point and setting the (n−m)th coordinate data as an end point in step S94. The vector B has the same structure as the vector A as shown in FIG. 32(A).

Next, it is determined in step S95 whether or not the vector A and the vector B have the same direction 321. When it is determined that the vector A and the vector B have the same direction 321 (Yes in step S95), the magnitude 322 of the vector B is added to the magnitude 322 of the vector A. m is incremented by one in step S97 and the process returns to step S94. That is, the input coordinate list 252 is referred to in order starting from the final input so as to calculate the vector. The vectors having the same direction 321 are collected as one vector. As a result, as shown in FIG. 30(B), the vectors f to d are collected as one vector.

On the other hand, when it is determined in step S95 that the vector A and the vector B have different directions 321 from each other (No in step S95), an input speed of the vector A is calculated. The input speed is calculated, for example, using the following equation:

$$S=m/L$$

wherein S represent an input speed and L represents a magnitude 322 of the vector A. The method for calculating the input speed is not restricted thereto. For example, the input detection time for the touch panel 15 is stored as necessary, and the time difference may be used to calculate the input speed.

Next, it is determined whether or not S is greater than a predetermined value in step S99. Only when the input speed has a value greater than the predetermined value, the lock-on process is performed as described below. When it is determined in step S99 that S is greater than the predetermined value, that is, the input speed has a value greater than the predetermined value, the magnitude 322 of the vector A is, for example, doubled in step S100 as shown in FIG. 30(C).

Next, it is determined whether or not an object is at coordinates on the vector A which is obtained by setting the final input coordinates (that is, the n-th coordinate data in the input coordinate list 252) as a start point in step S101. When it is determined that an object is at coordinates on the vector A (Yes in step S101), the lock flag 257 of the object is set as "ON" in step S102. When multiple corresponding objects are at coordinates on the vector A, only an object closest to the final input coordinates has its lock flag 257 set as "ON". At the same time, the target circle 81 having the object at the center thereof is generated. The remote flag is set as "ON" in step S103.

On the other hand, when it is determined in step S101 that no object is at coordinates on the vector A (No in step S101), the remote target determination process is ended. Thus, when an input is made such that the stick 16 is dragged on the touch panel 15 as if a match is stricken for lighting in steps S91 to S103, a remote object can be locked on, thereby enabling controllability for the player to be improved.

Returning to FIG. 29, it is determined whether or not the remote flag is set as "ON" in step S84. When it is determined that the remote flag is set as "ON" (Yes in step S84), it means that any object is locked on. The process is advanced to step S74. On the other hand, when it is determined that the remote flag is set as "OFF" (No in step S84), the process is advanced to step S79. The subsequent process is the same as the touch-off process of the first embodiment described with reference to FIG. 27, and a detailed description is not given.

Thus, according to the second embodiment, a remote object can be locked on at a time of the stick 16 being removed from the touch panel. Further, when an input speed is smaller than a predetermined speed, the remote object is not locked on. Therefore, an operation which a player does not intend to do can be avoided. For example, although the player intends to merely move the focus character, some object may be locked on to start a predetermined task. Such a situation can be avoided.

While the present invention has been described in detail, the foregoing description is in all aspects illustrative and not restrictive. It is understood that numerous other modifications and variations can be devised without departing form the scope of the invention.

What is claimed is:

1. A storage medium having stored thereon a game program to be executed by a computer in a game apparatus comprising a display screen that displays a game image and a pointing device associated with the display screen, the pointing device configured to designate a region on the display screen, wherein the computer is operable to execute:
   a coordinate detection step that detects a plurality of coordinate values which are inputted to the computer based on one or more output signals associated with the pointing device, wherein the plurality of coordinate values indicate the region on the display screen designated by the pointing device;
   a movement control step that moves a first object being displayed at least partially on the region when the first object displayed on the display screen is controlled by a player using the pointing device;
   a positional relationship determination step that determines whether or not a positional relationship on the display screen satisfies a predetermined condition between the region and a position corresponding to a second object currently displayed on the display screen; and
   an action control step that causes either one of the first object and the second object to perform a predetermined action against the other when the player is no longer controlling the first object using the pointing device and the positional relationship determination step determines that the positional relationship satisfies the predetermined condition.

2. The storage medium having the game program stored thereon according to claim 1, wherein the positional relationship determination step determines, when the player has stopped controlling the first object, a positional relationship between a final position of the second object, and the region on the display screen is represented by the coordinate value finally detected in the coordinate detection step.

3. The storage medium according to claim 1, wherein the positional relationship determination step determines, when the player has stopped controlling the first object, a positional relationship between a final position of the first object and a final position of the second object.

4. The storage medium according to claim 1, wherein the positional relationship determination step determines whether or not a distance between the second object and an input position has a value smaller than a predetermined value, based on positional information of the second object and positional information of the input position, the input position corresponding to a position associated with the region, and
   when a plurality of the second objects are away from the input position by a distance having a value smaller than the predetermined value, the action control step performs the predetermined action on a second object closest to the input position on the display screen among the plurality of the second objects.

5. The storage medium according to claim 1, wherein the action control step causes the first object having been controlled by the player to perform the predetermined action.

6. The storage medium according to claim 1, wherein the predetermined condition indicates that a distance between the second object and the region has a value smaller than a predetermined value.

7. The storage medium according to claim 1, wherein the action control step changes either one of a parameter value of the first object and a parameter value of the second object.

8. The storage medium according to claim 1, wherein the computer is operable to further execute a marking step for indicating on the screen, when the positional relationship determination step determines that the predetermined condition is satisfied, that the predetermined condition is satisfied.

9. The storage medium according to claim 8, wherein the positional relationship determination step determines whether or not the distance between the second object and the region has a value smaller than a predetermined value, and the marking step indicates, when a plurality of the second objects are away from the region by a distance having a value smaller than the predetermined value, only a second object closest to the input position on the display screen among the plurality of the second objects.

10. The storage medium according to claim 9, wherein after the marking step indicates on the screen the second object closest to the input position, the marking step continues to indicate, even when the distance between the second object and the input position is changed, the second object on the screen until the operation for exerting an effect is started.

11. The storage medium according to claim 8, wherein the computer is operable to further execute a type determination step for determining, when the positional relationship determination step determines that the predetermined condition is satisfied, a type of the second object which satisfies the predetermined condition, and the marking step indicates on the screen that the predetermined condition is satisfied by using at least one of a predetermined shape and a predetermined color according to the object type determined in the type determination step.

12. The storage medium according to claim 1, wherein the pointing device is a touch panel provided on the display screen, in a case where a first input coordinate value is obtained when the touch panel is touched initially after a player has stopped touching the touch panel, and the first input coordinate value is followed by a series of second input coordinate values being sequentially inputted, a movement control step moves the first object to a destination having the final second input coordinates in accordance with a predetermined algorithm, and the action control step causes the first object to perform a different operation depending on a type of the second object which is at a position corresponding to the second input coordinates which are detected before the player stops touching the touch panel.

13. A storage medium having stored thereon a game program executed by a computer in a game apparatus comprising a display screen configured to display a game image and a pointing device associated with the display screen, wherein the computer is operable to execute:

a coordinate detection step that detects a plurality of coordinate values which are inputted to the computer by the pointing device, wherein a player identifies a region on the display screen using the pointing device while at least one output signal is generated to represent the plurality of coordinate values and the output signal is received by the computer, and wherein the plurality of coordinate values indicates the region on the display screen;

a vector data calculation step in which vector data is calculated based on the plurality of coordinate values detected in the coordinate detection step, wherein the vector data indicates a direction of a destination to move a first object being controlled by the player and the first object is at least partially on the region;

a destination object determination step that determines whether or not a second object is in the direction indicated by the vector data when the player stops controlling the first object; and an action control step that causes either one of the first object being controlled by the player and the second object to perform a predetermined action against the other after the player ceases controlling the first object, after a final input position is determined during the coordinate detection step and after the destination object determination step determines that the second object is in the direction of the destination to move the first object toward.

14. The storage medium according to claim 13, wherein only when the player has stopped controlling the first object and a speed at which the player makes an input of the vector data has a value greater than a predetermined value, the destination object determination step determines whether or not the second object is in the direction of a vector represented by the vector data.

15. A game apparatus comprising a display screen for displaying a game image generated by a computer and a pointing device associated with the display screen and computer, comprising:

a coordinate detection section that detects a plurality of coordinate values which are inputted to the computer based on the pointing device, the coordinate values indicate a region on the display screen designated by the user using the pointing device and at least one output signal is generated to represent the plurality of coordinate values and the at least one output signal is received by the computer;

a movement control section, that moves a first object being displayed at least partially on the region, when the first object displayed is controlled by a player using the pointing device;

a positional relationship determination section that determines whether or not a positional relationship on the display screen satisfies a predetermined condition between a the region and a position corresponding to a second object currently displayed on the display screen; and an action control section that causes either one of the first object and the second object to perform a predetermined action against the other when the player is no longer controlling the first object using the pointing device and the positional relationship determination section determines that the positional relationship satisfies the predetermined condition.

* * * * *